(12) United States Patent
Nguyen et al.

(10) Patent No.: US 12,177,779 B2
(45) Date of Patent: Dec. 24, 2024

(54) SYSTEM AND METHOD FOR DETERMINING WI-FI TARGET WAKE TIME WAKE INTERVAL BASED ON NETWORK TRAFFIC SERVICE

(71) Applicant: Samsung Electronics Co., Ltd., Suwon-si (KR)

(72) Inventors: Khuong N. Nguyen, Frisco, TX (US); Wenxun Qiu, Allen, TX (US); Guanbo Chen, McKinney, TX (US); Peshal Nayak, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 361 days.

(21) Appl. No.: 17/656,589

(22) Filed: Mar. 25, 2022

(65) Prior Publication Data

US 2022/0377664 A1 Nov. 24, 2022

Related U.S. Application Data

(60) Provisional application No. 63/183,970, filed on May 4, 2021.

(51) Int. Cl.
*H04W 52/02* (2009.01)
*G06F 18/2411* (2023.01)
*G06F 18/2413* (2023.01)
*G06V 10/764* (2022.01)
*H04W 84/12* (2009.01)

(52) U.S. Cl.
CPC ..... *H04W 52/0216* (2013.01); *G06F 18/2411* (2023.01); *G06F 18/2413* (2023.01); *G06V 10/764* (2022.01); *H04W 84/12* (2013.01)

(58) Field of Classification Search
CPC ............ H04W 52/0216; H04W 84/12; G06V 10/764; G06F 18/2411; G06F 18/2413
See application file for complete search history.

(56) References Cited

U.S. PATENT DOCUMENTS

| 9,801,085 | B2 | 10/2017 | Hevizi et al. |
| 10,194,391 | B2 | 1/2019 | Asterjadhi et al. |

(Continued)

FOREIGN PATENT DOCUMENTS

| CN | 109639481 A | 4/2019 |
| CN | 110730140 A | 1/2020 |

(Continued)

OTHER PUBLICATIONS

USPTO, Office Action issued Dec. 7, 2023 regarding U.S. Appl. No. 18/047,241, 21 pages.

(Continued)

*Primary Examiner* — Erika A Washington

(57) ABSTRACT

A method includes obtaining network traffic information based on network traffic received during a time window. The method also includes determining a network service type using a machine learning classification system operating on the network traffic information. The method also includes determining a latency requirement based on the network service type. The method also includes adjusting one or more Target Wakeup Time (TWT) intervals and a wake duration based on the latency requirement to optimize power consumption of a Wi-Fi station.

20 Claims, 19 Drawing Sheets

(56) References Cited

U.S. PATENT DOCUMENTS

| | | | |
|---|---|---|---|
| 10,925,001 | B2 | 2/2021 | Bhanage et al. |
| 10,999,325 | B1 | 5/2021 | Chandana et al. |
| 2006/0120282 | A1 | 6/2006 | Carlson et al. |
| 2007/0078958 | A1 | 4/2007 | Bennett |
| 2014/0135051 | A1 | 5/2014 | Ghosh |
| 2014/0321290 | A1 | 10/2014 | Jin et al. |
| 2014/0334365 | A1* | 11/2014 | Jafarian ............ H04W 52/0219 370/311 |
| 2015/0195149 | A1 | 7/2015 | Vasseur et al. |
| 2016/0381636 | A1* | 12/2016 | Park ................... H04L 27/0002 370/311 |
| 2018/0150125 | A1 | 5/2018 | HomChaudhuri et al. |
| 2019/0306790 | A1 | 10/2019 | Kottontavida et al. |
| 2020/0084102 | A1 | 3/2020 | Choi et al. |
| 2020/0137612 | A1 | 4/2020 | Li et al. |
| 2020/0304381 | A1 | 9/2020 | Wang et al. |
| 2020/0366717 | A1 | 11/2020 | Chaubey |
| 2021/0037546 | A1 | 2/2021 | Luo et al. |
| 2021/0044572 | A1 | 2/2021 | Liu et al. |
| 2021/0136178 | A1 | 5/2021 | Casey et al. |

FOREIGN PATENT DOCUMENTS

| | | |
|---|---|---|
| CN | 110311829 B | 3/2021 |
| CN | 109787958 B | 5/2021 |
| CN | 112994966 A | 6/2021 |
| CN | 110430166 B | 12/2021 |
| CN | 113890857 A | 1/2022 |

OTHER PUBLICATIONS

International Search Report issued Aug. 3, 2022 regarding International Application No. PCT/KR2022/005738, 3 pages.

Tang et al., "Fine-Grained Classification of Internet Video Traffic From QoS Perspective Using Fractal Spectrum", IEEE Transactions on Multimedia, vol. 22, No. 10, Dec. 2019, pp. 2579-2596.

USPTO, Office Action issued Jul. 11, 2023 regarding U.S. Appl. No. 18/047,241, 21 pages.

* cited by examiner

SYSTEM AND METHOD FOR DETERMINING WI-FI TARGET WAKE TIME WAKE INTERVAL BASED ON NETWORK TRAFFIC SERVICE

CROSS-REFERENCE TO RELATED APPLICATIONS AND CLAIM OF PRIORITY

The present application claims priority under 35 U.S.C. § 119(e) to U.S. Provisional Patent Application Ser. No. 63/183,970 filed on May 4, 2021, which is hereby incorporated by reference in its entirety.

TECHNICAL FIELD

The present disclosure relates generally to wireless communication systems and, more specifically, the present disclosure relates to a system and method for determining a Wi-Fi Target Wake Time wake interval based on network traffic service.

BACKGROUND

With the standardization process of the next generation IEEE 802.11 wireless local area network (WLAN), i.e., IEEE 802.1 lax amendment entering the final stage, the IEEE 802.1 lax amendment is drawing attention of the information technology (IT) industry. It newly introduces features for improving peak throughput and efficiency in an environment crowded by many 802.11 devices. Example environments include airports, stadiums, and so on. Wi-Fi alliance (WFA) has already launched the Wi-Fi 6 certification program for guaranteeing interoperability between certified products implementing IEEE 802.1 lax amendment. In the market, device manufacturers are already starting to release Wi-Fi 6 certified smart mobile devices.

Target Wake Time (TWT) is one of the important features of the IEEE 802.1 lax amendment. TWT enables wake time negotiation between an access point (AP) and an associated station (STA) for improving power efficiency. The wake time negotiation gives rise to TWT sessions (e.g., consecutive TWT sessions), where the STA wakes up at pre-negotiated times and for specified durations of time to communicate with the AP (e.g., via UL and/or DL communications). The IEEE 802.1 lax amendment allows for periodic awakening, non-periodic awakening, and at-will awakening by the STA.

SUMMARY

The present disclosure relates to wireless communication systems and, more specifically, to a system and method for determining a TWT wake interval based on network traffic service.

In one embodiment, a method includes obtaining network traffic information based on network traffic received during a time window. The method also includes determining a network service type using a machine learning classification system operating on the network traffic information. The method also includes determining a latency requirement based on the network service type. The method also includes adjusting one or more Target Wakeup Time (TWT) intervals and a wake duration based on the latency requirement to optimize power consumption of a Wi-Fi station.

In another embodiment, a device includes a memory configured to store instructions. The device also includes a processor operably connected to the memory. The processor is configured when executing the instructions to obtain network traffic information based on network traffic received during a time window; determine a network service type using a machine learning classification system operating on the network traffic information; determine a latency requirement based on the network service type; and adjust one or more TWT intervals and a wake duration based on the latency requirement to optimize power consumption of a Wi-Fi station.

In yet another embodiment, a non-transitory computer readable medium includes a plurality of instructions. The plurality of instructions, when executed by at least one processor, is configured to cause the at least one processor to obtain network traffic information based on network traffic received during a time window; determine a network service type using a machine learning classification system operating on the network traffic information; determine a latency requirement based on the network service type; and adjust one or more TWT intervals and a wake duration based on the latency requirement to optimize power consumption of a Wi-Fi station.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

The present disclosure covers several components which can be used in conjunction or in combination with one another, or can operate as standalone schemes.

Figure 1:
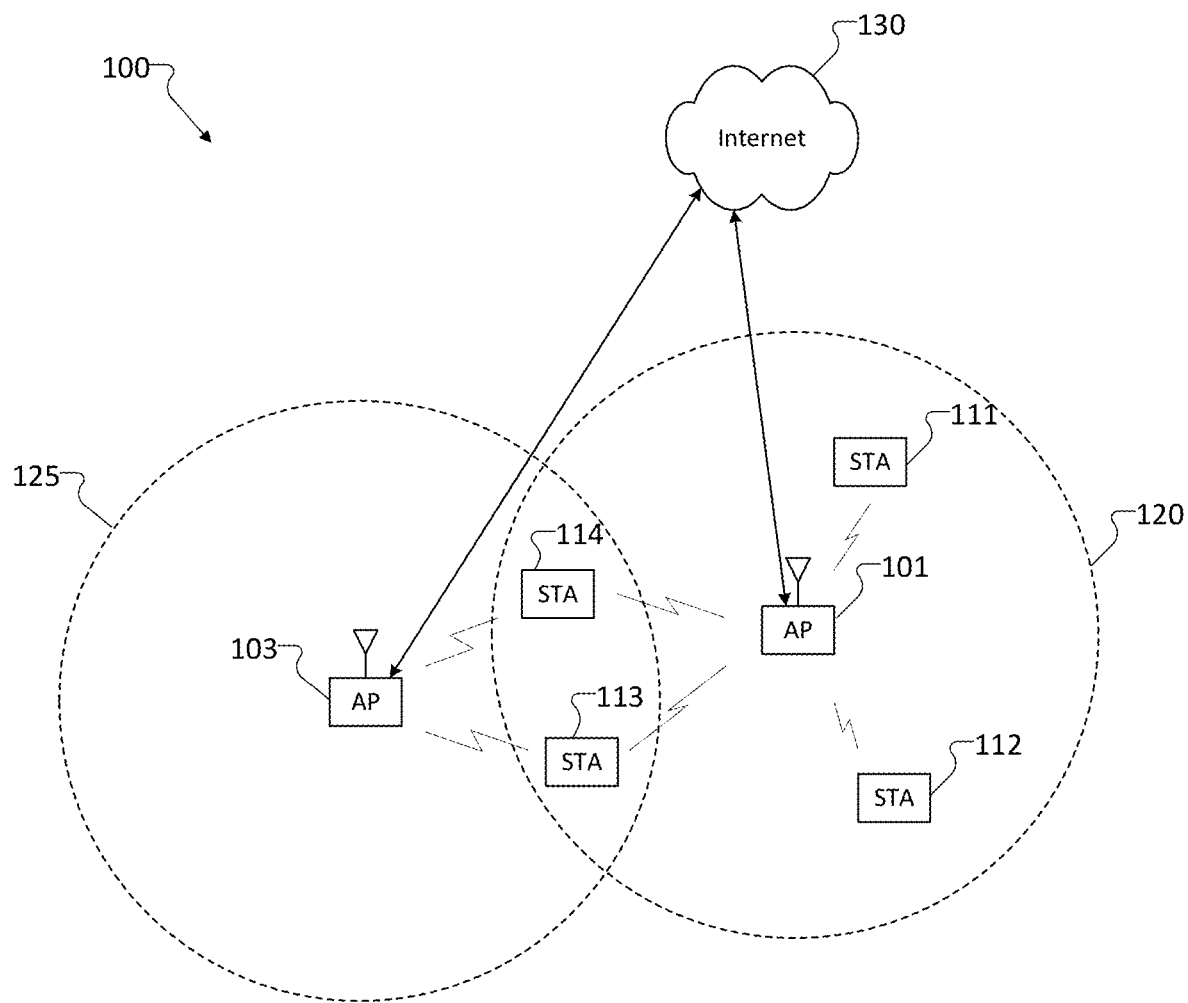
FIG. 1 illustrates an example wireless network according to embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of this disclosure.

The wireless network 100 includes access points (APs) 101 and 103. The APs 101 and 103 communicate with at least one network 130, such as the Internet, a proprietary Internet Protocol (IP) network, or other data network. The AP 101 provides wireless access to the network 130 for a plurality of stations (STAs) 111-114 within a coverage area 120 of the AP 101. The APs 101-103 may communicate with each other and with the STAs 111-114 using Wi-Fi or other WLAN communication techniques.

Depending on the network type, other well-known terms may be used instead of "access point" or "AP," such as "router" or "gateway." For the sake of convenience, the term "AP" is used in this disclosure to refer to network infrastructure components that provide wireless access to remote terminals. In WLAN, given that the AP also contends for the wireless channel, the AP may also be referred to as a STA. Also, depending on the network type, other well-known terms may be used instead of "station" or "STA," such as "mobile station," "subscriber station," "remote terminal," "user equipment," "wireless terminal," or "user device." For the sake of convenience, the terms "station" and "STA" are used in this disclosure to refer to remote wireless equipment that wirelessly accesses an AP or contends for a wireless channel in a WLAN, whether the STA is a mobile device (such as a mobile telephone or smartphone) or is normally considered a stationary device (such as a desktop computer, AP, media player, stationary sensor, television, etc.).

Dotted lines show the approximate extents of the coverage areas 120 and 125, which are shown as approximately circular for the purposes of illustration and explanation only. It should be clearly understood that the coverage areas associated with APs, such as the coverage areas 120 and 125, may have other shapes, including irregular shapes, depending upon the configuration of the APs and variations in the radio environment associated with natural and man-made obstructions.

As described in more detail below, one or more of the APs may include circuitry and/or programming for determining parameters for target wake time (TWT) operations in WLANs (e.g., the TWT interval). Although FIG. 1 illustrates one example of a wireless network 100, various changes may be made to FIG. 1. For example, the wireless network 100 could include any number of APs and any number of STAs in any suitable arrangement. Also, the AP 101 could communicate directly with any number of STAs and provide those STAs with wireless broadband access to the network 130. Similarly, each AP 101-103 could communicate directly with the network 130 and provide STAs with direct wireless broadband access to the network 130. Further, the APs 101 and/or 103 could provide access to other or additional external networks, such as external telephone networks or other types of data networks.

Figure 2A:
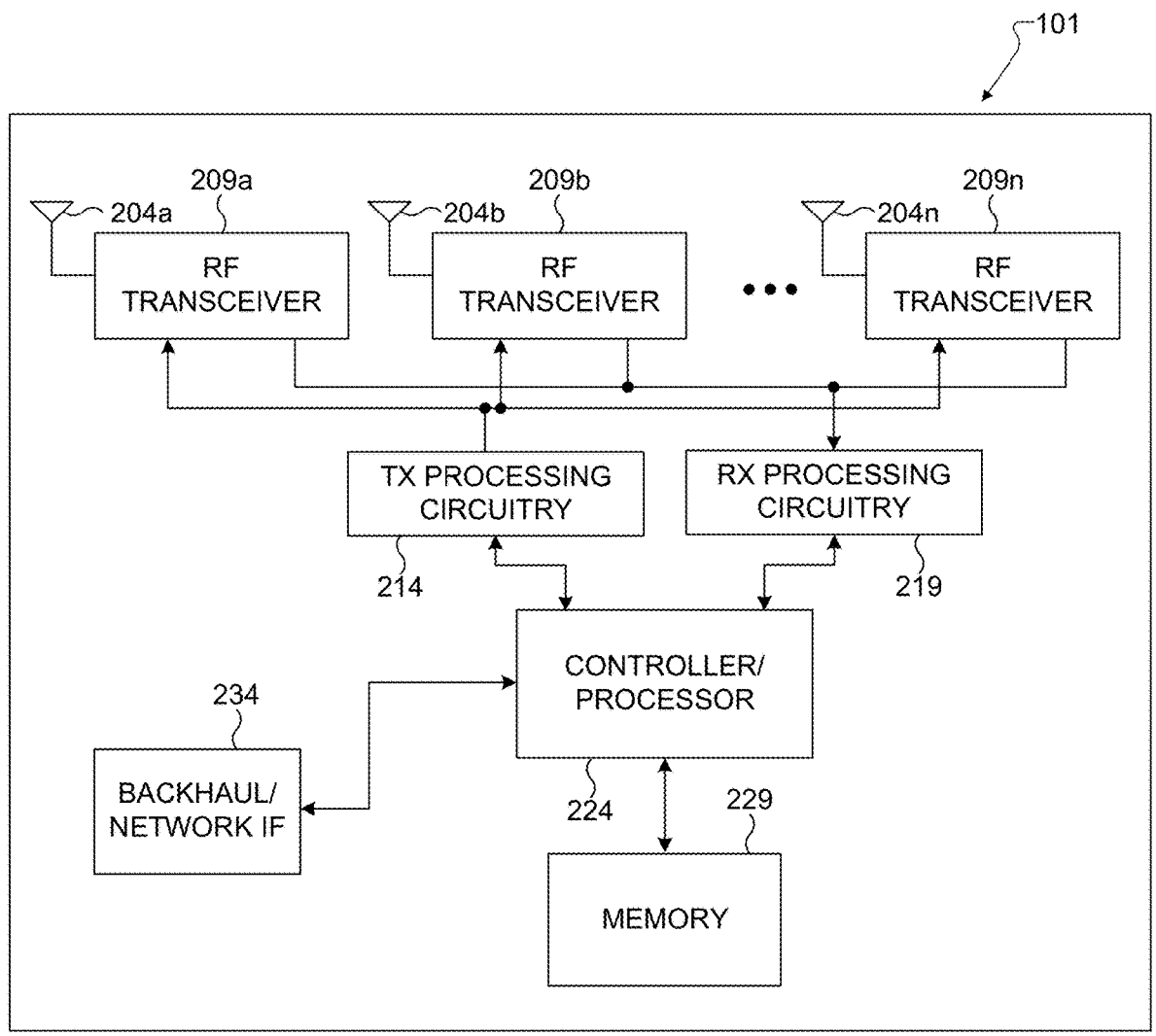
FIG. 2A illustrates an example AP according to embodiments of the present disclosure.

FIG. 2A illustrates an example AP 101 according to various embodiments of the present disclosure. The embodiment of the AP 101 illustrated in FIG. 2A is for illustration only, and the AP 103 of FIG. 1 could have the same or similar configuration. However, APs come in a wide variety of configurations, and FIG. 2A does not limit the scope of this disclosure to any particular implementation of an AP.

The AP 101 includes multiple antennas 204a-204n, multiple RF transceivers 209a-209n, transmit (TX) processing circuitry 214, and receive (RX) processing circuitry 219. The AP 101 also includes a controller/processor 224, a memory 229, and a backhaul or network interface 234. The RF transceivers 209a-209n receive, from the antennas 204a-204n, incoming RF signals, such as signals transmitted by STAs in the network 100. The RF transceivers 209a-209n down-convert the incoming RF signals to generate IF or baseband signals. The IF or baseband signals are sent to the RX processing circuitry 219, which generates processed baseband signals by filtering, decoding, and/or digitizing the baseband or IF signals. The RX processing circuitry 219 transmits the processed baseband signals to the controller/processor 224 for further processing.

The TX processing circuitry 214 receives analog or digital data (such as voice data, web data, e-mail, or interactive video game data) from the controller/processor 224. The TX processing circuitry 214 encodes, multiplexes, and/or digitizes the outgoing baseband data to generate processed baseband or IF signals. The RF transceivers 209a-209n receive the outgoing processed baseband or IF signals from the TX processing circuitry 214 and up-converts the baseband or IF signals to RF signals that are transmitted via the antennas 204a-204n.

The controller/processor 224 can include one or more processors or other processing devices that control the overall operation of the AP 101. For example, the controller/processor 224 could control the reception of uplink channel signals and the transmission of downlink channel signals by the RF transceivers 209a-209n, the RX processing circuitry 219, and the TX processing circuitry 214 in accordance with well-known principles. The controller/processor 224 could support additional functions as well, such as more advanced wireless communication functions. For instance, the controller/processor 224 could support beam forming or directional routing operations in which outgoing signals from multiple antennas 204a-204n are weighted differently to effectively steer the outgoing signals in a desired direction. The controller/processor 224 could also support OFDMA operations in which outgoing signals are assigned to different subsets of subcarriers for different recipients (e.g., different STAs 111-114). Any of a wide variety of other functions could be supported in the AP 101 by the controller/processor 224 including determining parameters for TWT operations. In some embodiments, the controller/processor 224 includes at least one microprocessor or microcontroller. The controller/processor 224 is also capable of executing programs and other processes resident in the memory 229, such as an OS. The controller/processor 224 can move data into or out of the memory 229 as required by an executing process.

The controller/processor 224 is also coupled to the backhaul or network interface 234. The backhaul or network interface 234 allows the AP 101 to communicate with other devices or systems over a backhaul connection or over a network. The interface 234 could support communications over any suitable wired or wireless connection(s). For example, the interface 234 could allow the AP 101 to communicate over a wired or wireless local area network or over a wired or wireless connection to a larger network (such as the Internet). The interface 234 includes any suitable structure supporting communications over a wired or wireless connection, such as an Ethernet or RF transceiver. The memory 229 is coupled to the controller/processor 224. Part of the memory 229 could include a RAM, and another part of the memory 229 could include a Flash memory or other ROM.

As described in more detail below, the AP 101 may include circuitry and/or programming for determining parameters for TWT operations in WLANs (e.g., the TWT interval). Although FIG. 2A illustrates one example of AP 101, various changes may be made to FIG. 2A. For example, the AP 101 could include any number of each component shown in FIG. 2A. As a particular example, an access point could include a number of interfaces 234, and the controller/processor 224 could support routing functions to route data between different network addresses. As another particular example, while shown as including a single instance of TX processing circuitry 214 and a single instance of RX processing circuitry 219, the AP 101 could include multiple instances of each (such as one per RF transceiver). Alternatively, only one antenna and RF transceiver path may be included, such as in legacy APs. Also, various components in FIG. 2A could be combined, further subdivided, or omitted and additional components could be added according to particular needs.

Figure 2B:
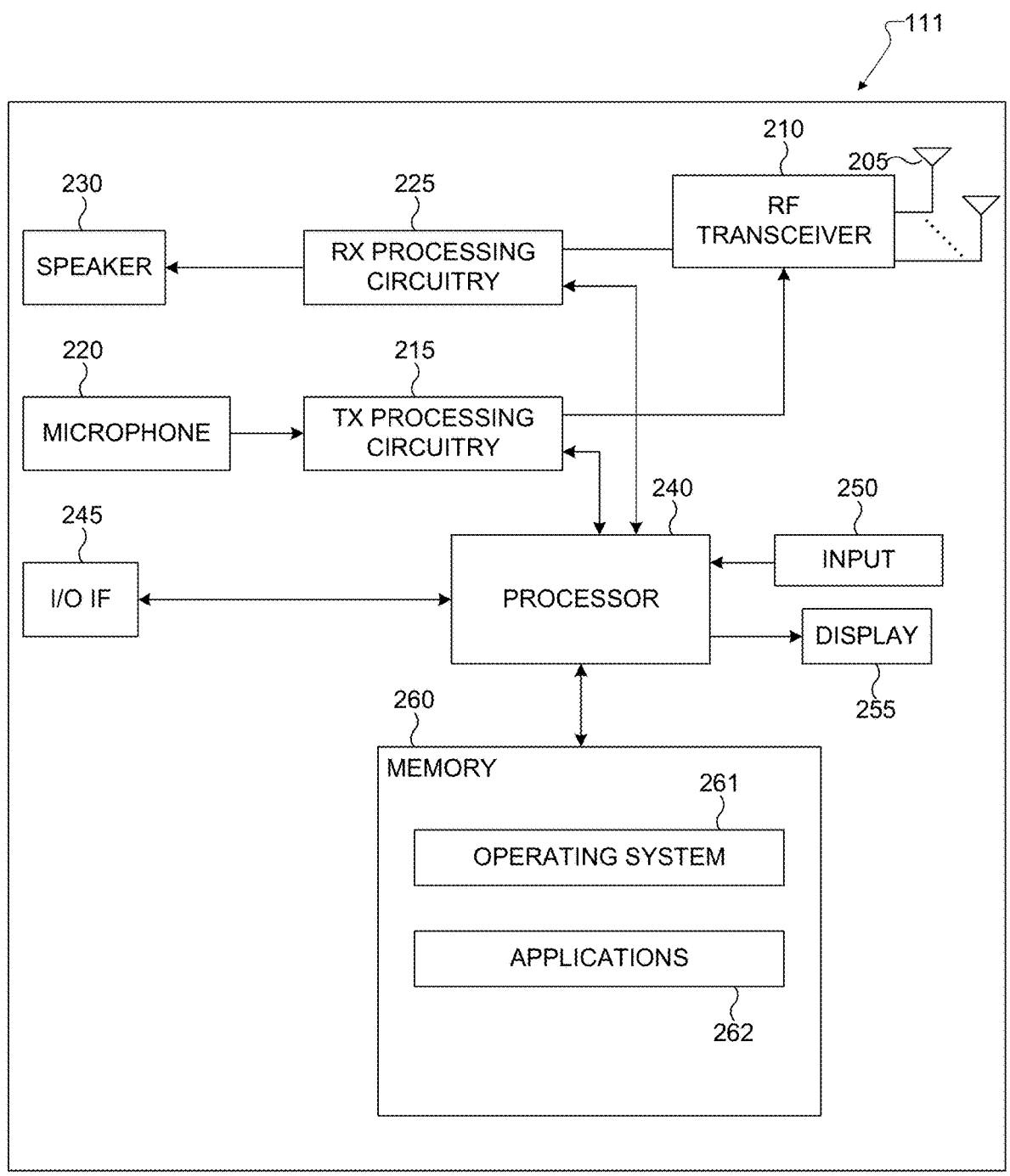
FIG. 2B illustrates an example STA according to embodiments of the present disclosure.

FIG. 2B illustrates an example STA 111 according to various embodiments of this disclosure. The embodiment of the STA 111 illustrated in FIG. 2B is for illustration only, and the STAs 112-114 of FIG. 1 could have the same or similar configuration. However, STAs come in a wide variety of configurations, and FIG. 2B does not limit the scope of this disclosure to any particular implementation of a STA.

The STA 111 includes antenna(s) 205, a radio frequency (RF) transceiver 210, TX processing circuitry 215, a microphone 220, and receive (RX) processing circuitry 225. The STA 111 also includes a speaker 230, a controller/processor 240, an input/output (I/O) interface (IF) 245, a touchscreen 250, a display 255, and a memory 260. The memory 260 includes an operating system (OS) 261 and one or more applications 262.

The RF transceiver 210 receives, from the antenna(s) 205, an incoming RF signal transmitted by an AP of the network 100. The RF transceiver 210 down-converts the incoming RF signal to generate an intermediate frequency (IF) or baseband signal. The IF or baseband signal is sent to the RX processing circuitry 225, which generates a processed baseband signal by filtering, decoding, and/or digitizing the baseband or IF signal. The RX processing circuitry 225 transmits the processed baseband signal to the speaker 230 (such as for voice data) or to the controller/processor 240 for further processing (such as for web browsing data).

The TX processing circuitry 215 receives analog or digital voice data from the microphone 220 or other outgoing baseband data (such as web data, e-mail, or interactive video game data) from the controller/processor 240. The TX processing circuitry 215 encodes, multiplexes, and/or digitizes the outgoing baseband data to generate a processed baseband or IF signal. The RF transceiver 210 receives the outgoing processed baseband or IF signal from the TX processing circuitry 215 and up-converts the baseband or IF signal to an RF signal that is transmitted via the antenna(s) 205.

The controller/processor 240 can include one or more processors and execute the basic OS program 261 stored in the memory 260 in order to control the overall operation of the STA 111. In one such operation, the main controller/processor 240 controls the reception of downlink channel signals and the transmission of uplink channel signals by the RF transceiver 210, the RX processing circuitry 225, and the TX processing circuitry 215 in accordance with well-known principles. The main controller/processor 240 can also include processing circuitry configured to determine parameters for TWT operations in WLANs (e.g., the TWT interval). In some embodiments, the controller/processor 240 includes at least one microprocessor or microcontroller.

The controller/processor 240 is also capable of executing other processes and programs resident in the memory 260, such as operations for determining parameters for TWT operations in WLANs. The controller/processor 240 can move data into or out of the memory 260 as required by an executing process. In some embodiments, the controller/processor 240 is configured to execute a plurality of applications 262, such as applications for determining an idle or active state of the Wi-Fi link, and determining TWT parameters such as the TWT interval for TWT operation. The controller/processor 240 can operate the plurality of applications 262 based on the OS program 261 or in response to a signal received from an AP. The main controller/processor 240 is also coupled to the I/O interface 245, which provides STA 111 with the ability to connect to other devices such as laptop computers and handheld computers. The I/O interface 245 is the communication path between these accessories and the main controller 240.

The controller/processor 240 is also coupled to the touchscreen 250 and the display 255. The operator of the STA 111 can use the touchscreen 250 to enter data into the STA 111. The display 255 may be a liquid crystal display, light emitting diode display, or other display capable of rendering text and/or at least limited graphics, such as from web sites. The memory 260 is coupled to the controller/processor 240. Part of the memory 260 could include a random access memory (RAM), and another part of the memory 260 could include a Flash memory or other read-only memory (ROM).

Although FIG. 2B illustrates one example of STA 111, various changes may be made to FIG. 2B. For example, various components in FIG. 2B could be combined, further subdivided, or omitted and additional components could be added according to particular needs. In particular examples, the STA 111 may include any number of antenna(s) 205 for MIMO communication with an AP 101. In another example, the STA 111 may not include voice communication or the controller/processor 240 could be divided into multiple processors, such as one or more central processing units (CPUs) and one or more graphics processing units (GPUs). Also, while FIG. 2B illustrates the STA 111 configured as a mobile telephone or smartphone, STAs could be configured to operate as other types of mobile or stationary devices.

Figure 3:
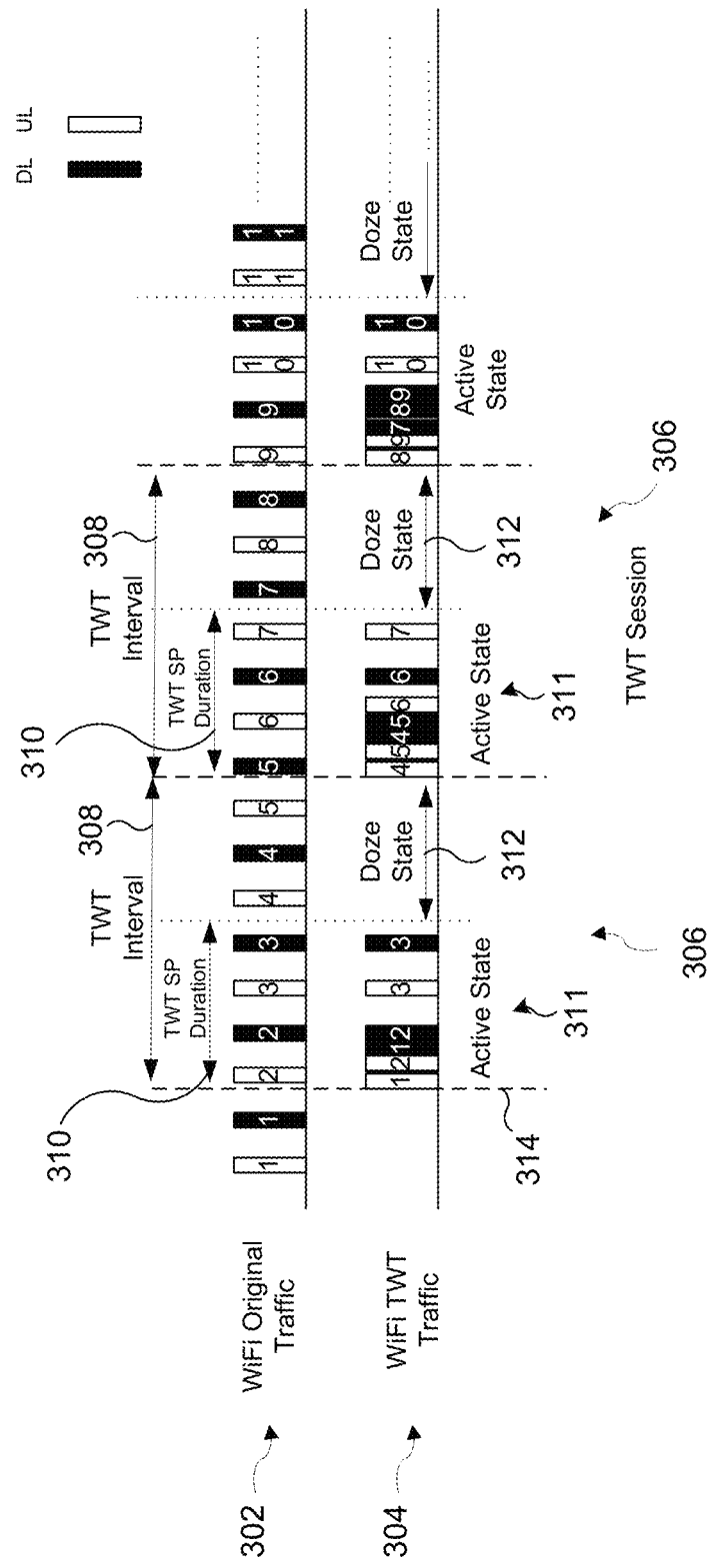
FIG. 3 illustrates a diagram of packet exchange between devices according to embodiments of the present disclosure.

FIG. 3 illustrates a diagram of packet exchange between devices according to embodiments of the present disclosure. For the purposes of this disclosure, the figures will be discussed from the point of view of a STA, which may be a STA 111, but it is understood that it could be any suitable wireless communication device.

FIG. 3 illustrates two scenarios of exchange of uplink (UL) communication packets and downlink (DL) communication packets (which may be collectively referred to as traffic) between an AP and an associated client STA. First, without wake time negotiation between the AP and the STA (e.g., as seen in the top graph 302), and second, with wake time negotiation between the AP and the STA (e.g., in an IEEE 802.11ax system and as seen in the bottom graph 304). In the top graph 302, there is a regular stream of non-buffered traffic between the AP and the STA, with UL packets being interspersed with DL packets. In this scenario (i.e., without wake time negotiation) there is no option for the STA to enter a doze state or a power save state.

By contrast, in the bottom graph 304, wake time negotiation gives rise to consecutive TWT sessions 306. Each TWT session 306 is defined as the time period from the beginning of a TWT interval 308 to the end of the TWT interval 308. Each TWT session 306 includes two states: an active state 311, defined by a TWT service period (SP) duration 310 (during which the STA is awake to communicate with the AP), and a power save state or doze state 312 (during which the STA is not actively awake or communicating with the AP). As a result of wake time negotiation, power efficiency at the STA is improved without adding too much latency or allowing UL or DL packets to be dropped.

In wake time negotiation, the negotiated TWT parameters include the wake interval (e.g., the TWT interval 308 for each TWT session 306), wake duration (e.g. the TWT SP duration 310 for each TWT session 306), and initial wake time or offset (e.g., indicated by the TWT start time 314). These negotiated parameters highly affect latency, throughput, and power efficiency, which are directly related to the QoS (quality of service) a customer experiences. Services with different traffic characteristics can have different TWT parameter configurations for better QoS. Additionally, the TWT configuration should adapt to network and service status variation.

Figure 4:
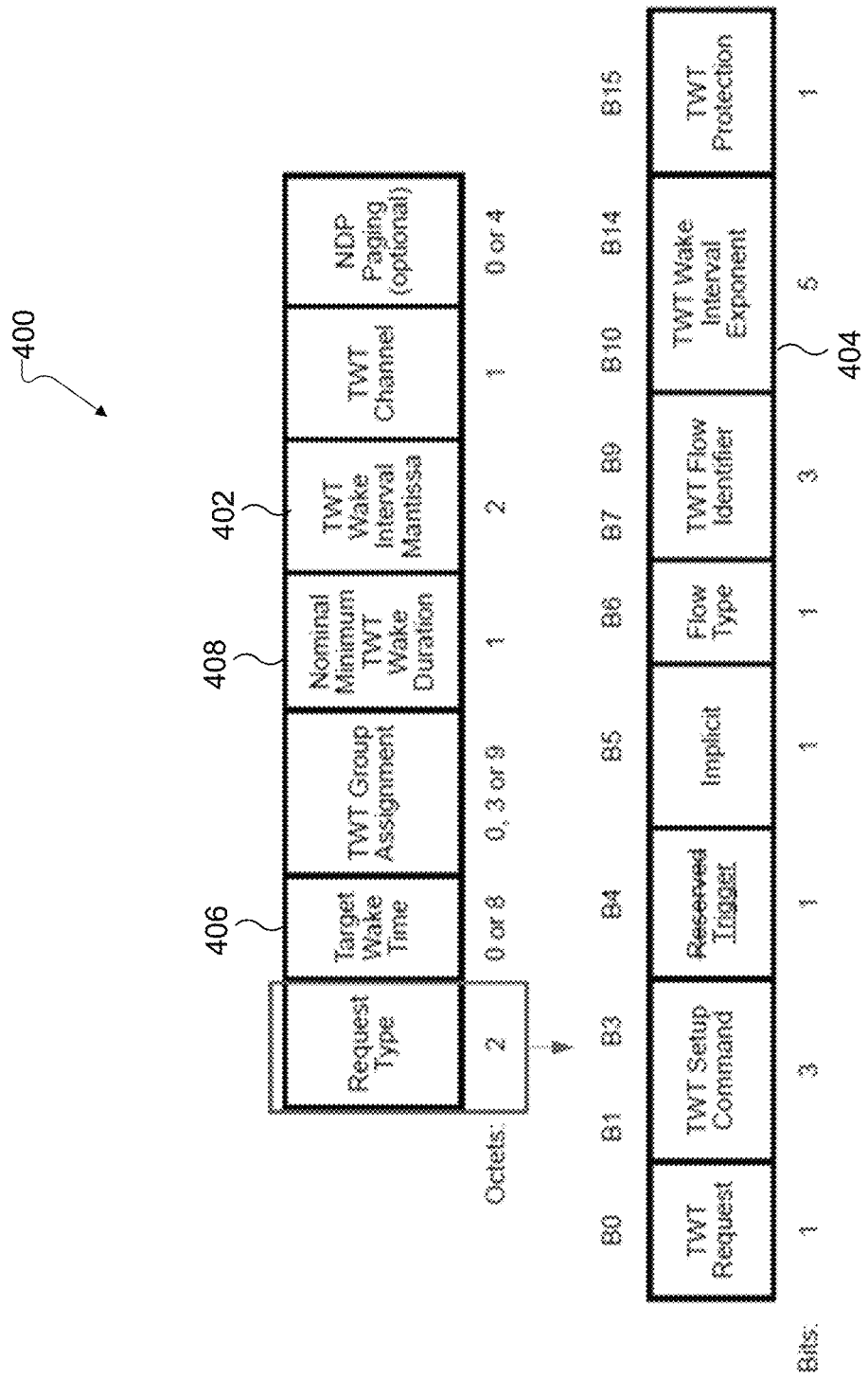
FIG. 4 illustrates an example TWT parameter set field used for TWT parameter negotiation according to embodiments of the present disclosure.

In some embodiments, a TWT parameter set field is used to negotiate the TWT parameters. FIG. 4 illustrates an example TWT parameter set field 400 used for TWT parameter negotiation according to embodiments of the present disclosure. The TWT agreement is initiated by a STA sending a TWT negotiation request to an AP. Once a TWT agreement is made between the AP and the STA, the STA periodically wakes up to communicate with the AP, where the interval between the successive wake times is jointly specified by the TWT wake interval mantissa 402 and TWT wake interval exponent 404 subfields in the TWT parameter set field 400.

The target wake time 406 and nominal minimum TWT wake duration 408 subfields specify, respectively, the first wake time for the TWT agreement, and the time for which the STA must wait before going to doze state when there is no transmitted traffic after a wake time, which is the TWT SP duration 310 in FIG. 3.

Figure 5:
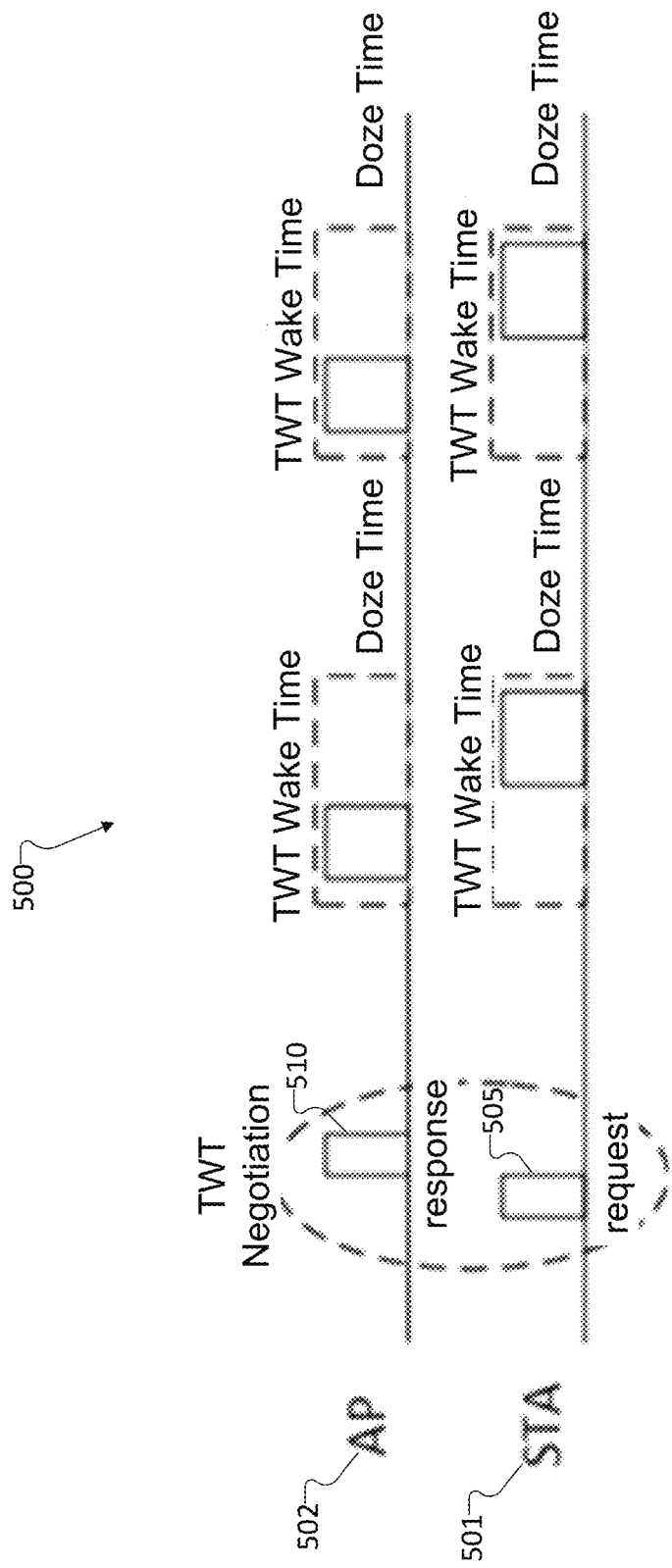
FIG. 5 illustrates an example interaction using individual TWT according to embodiments of the present disclosure.

There are two types of TWT: broadcast TWT and individual TWT. In broadcast TWT, the AP sets up a shared TWT agreement for a group of STAs. Beacon is used in broadcast TWT. FIG. 5 illustrates an example interaction 500 using individual TWT. As shown in FIG. 5, individual TWT, which is different from broadcast TWT, is initiated by an STA 501. The STA 501 sends the TWT request 505 to an AP 502, and the AP 502 sends a response 510 to the TWT request 505. This process is called TWT negotiation. Eventually, the STA 501 and the AP 502 make an agreement on the TWT parameters called a TWT agreement. The network can support up to eight TWT agreements simultaneously.

Figure 6:
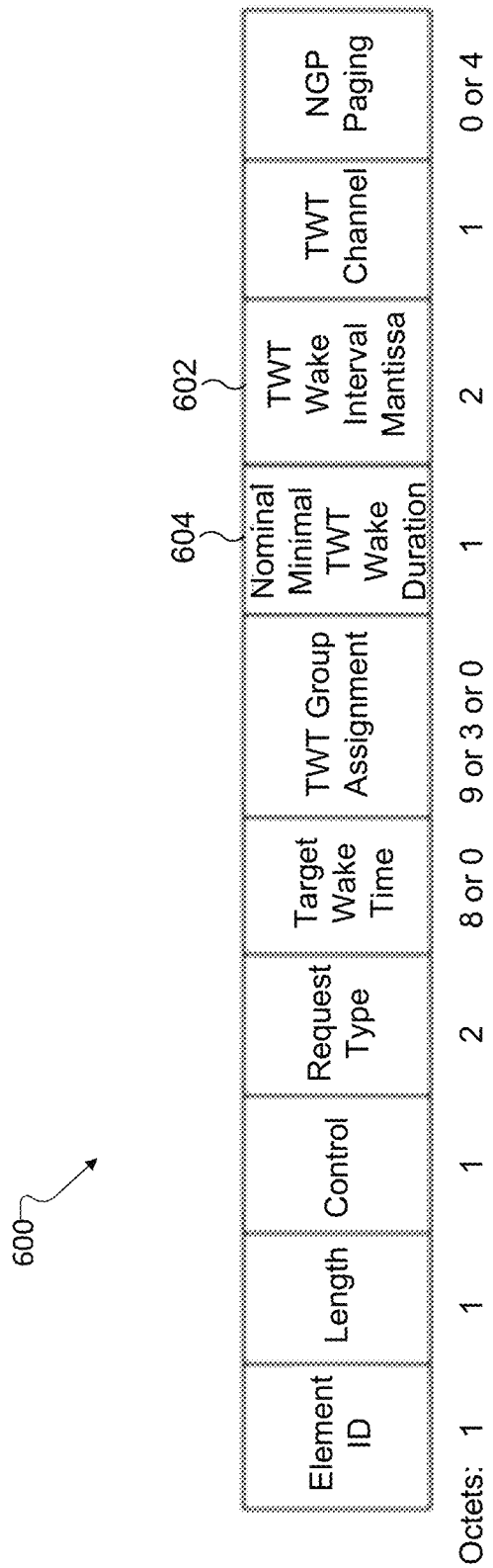
FIG. 6 illustrates an example format of a TWT element according to embodiments of the present disclosure.

To initiate a TWT negotiation, the STA sends a TWT request by a TWT element. FIG. 6 illustrates an example format of a TWT element 600. There are two key parameters in TWT as discussed below. By configuring these two parameters, the duty cycle of the 802.11ax link can be controlled.

TWT Wake Interval: The TWT wake interval is the wake-up time interval between two consecutive TWT sessions. The value is defined by a 'TWT Wake Interval Mantissa' field 602 in the TWT element 600. Ideally, the value of the TWT wake interval should be greater than 0. In many practical implementations, the TWT wake interval normally has a minimal value, e.g., 10 ms.

Minimum TWT Wake Duration: The minimum TWT wake duration is the minimum TWT time duration that a STA shall stay awake after the starting time of the TWT SP. The value is defined by a 'Nominal Minimal TWT Wake Duration' field 604 in the TWT element 600. In this duration, the STA is able to receive data frames from and transmit data frames to the AP or another STA.

Figure 7:
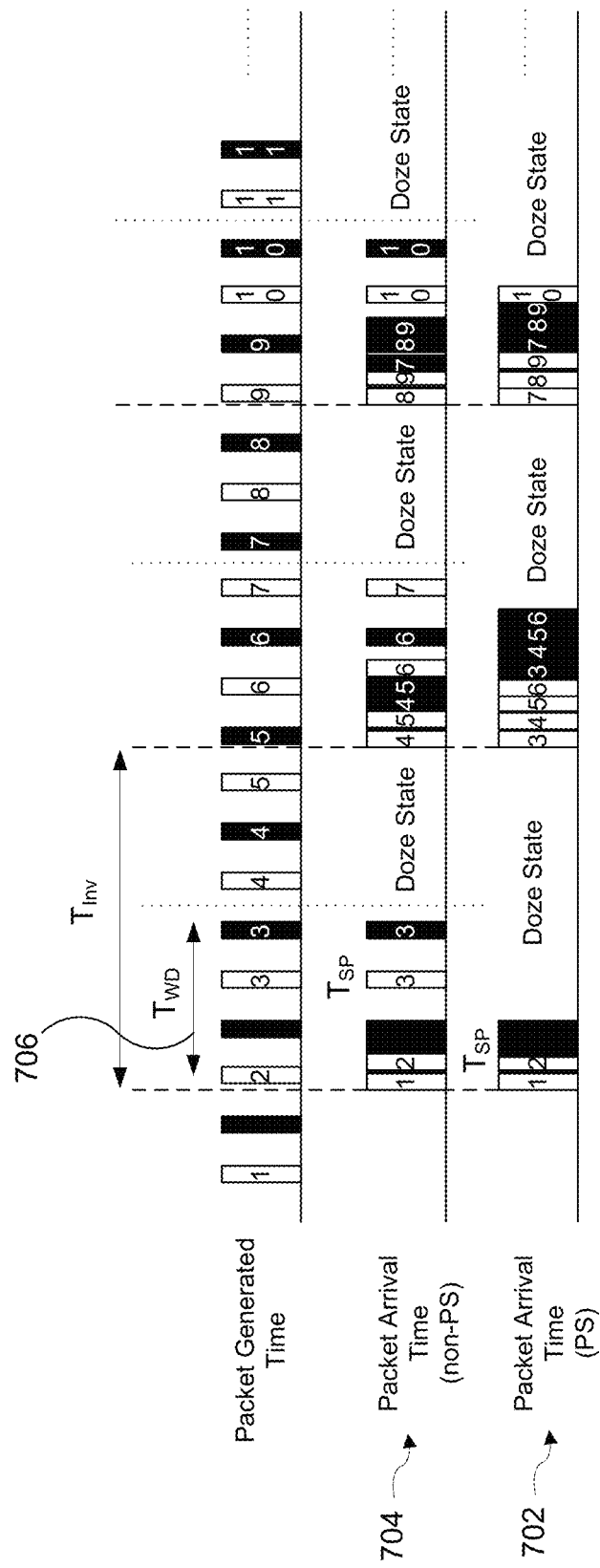
FIG. 7 illustrates a comparison of early termination and non-early termination in TWT according to embodiments of the present disclosure.

In this document, $T_{inv}$ and $T_{wd}$ are used to represent TWT wake interval and minimum TWT wake duration, respectively. Note that although $T_{wd}$ is the minimum TWT wake duration, the actual TWT wake time $T_{SP}$ can be shorter than $T_{wd}$. This is because $T_{wd}$ is the minimum in the TWT mechanism, but Wi-Fi legacy Power Save (PS) mode can work on top of the TWT operation. In PS mode, if it is indicated that there is no more data to receive and transmit by end of the SP (EOSP) or other signaling, the TWT SP shall terminate. The different TWT behaviors in PS mode and non-PS mode is shown in FIG. 7. FIG. 7 illustrates a comparison of early termination and non-early termination. On one hand, in PS mode 702, the TWT SP could be terminated before reaching $T_{wd}$ 706, which is called early termination. On the other hand, in non-PS mode 704, the STA waits until $T_{wd}$ 706 to finish a SP, which is called non-early termination. Therefore, in early termination case, $T_{SP}$ could be smaller than $T_{Wd}$. In practical systems, the early termination case could be common, as it saves more power.

As discussed above, Wi-Fi access has become a fundamental technology for our everyday life. Efficient Wi-Fi is the foundation for large and reliable data transportation, which open the doors for further technologies to be developed. However, transmitting large amounts of data also consumes significant energy. Recently, the 802.1lax standards were introduced that facilitate high-bandwidth wireless and also include TWT. With TWT, the devices can determine when and how frequently they will wake up to send and receive data. This in turn can significantly reduce the power consumption. Yet, TWT parameters such as latency requirements and wake interval need to be configured to function properly.

In this disclosure, various embodiments are described for TWT parameter run-time configuration, in which the latency requirement is based on algorithm detection instead of inputting from outside. The TWT parameters mainly include the two key parameters: $T_{inv}$ and $T_{wd}$. First, the relation between $T_{inv}$, $T_{wd}$ and the effective latency $T_L$ is examined. In the $i^{th}$ TWT SP, $T_{inv}$, $T_{wd}$ and $T_{SP}$ are denoted as $T_{inv,i}$, $T_{wd,i}$ and $T_{SP,i}$, respectively. Assuming the all the packets are generated before the end of each SP can be completed in transmission and reception within the current $T_{SP,i}$, the maximum latency for $i^{th}$ TWT session can be expressed as:

$$T_{L,i} = T_{inv,i-1} - T_{SP,i-1} + T_{pkt,i} \quad (1)$$

where $T_{pkt,i}$ is the time from the $i^{th}$ TWT SP starting to the completion of the first data packet. In reality, the TWT renegotiation could require up to several rounds of Wi-Fi management frame exchange, which would introduce unavoidable overhead. Therefore, for practical reasons, the TWT renegotiation would not happen for every TWT SP, but instead keeps the same TWT parameters for a while (e.g., several seconds). In this case, Equation 1 can be rewritten as:

$$T_{L,i} = T_{inv} - T_{SP,i-1} + T_{pkt,i} \quad (2)$$

Considering $T_{L,i}$ needs to be no greater than the latency requirement ($T_{L,Req}$), the requirement on $T_{inv}$ can be expressed as:

$$T_{L,i} \leq T_{L,Req} + T_{SP,i-1} - T_{pkt,i} \quad (3)$$

Figure 8:
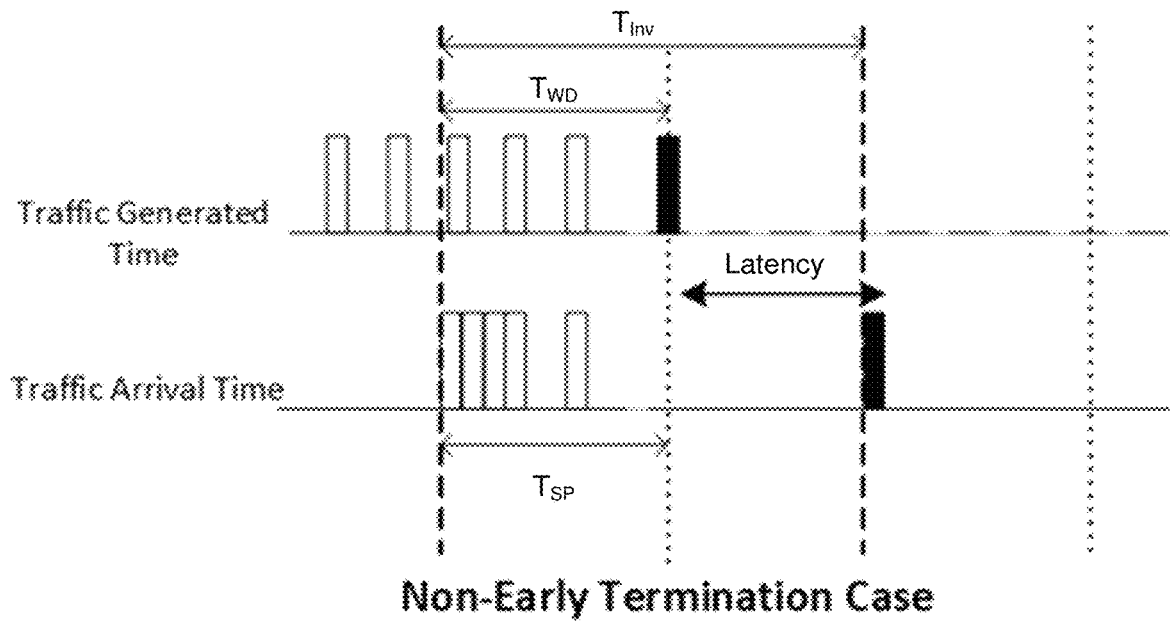
FIG. 8 illustrates a comparison of latency in early termination and non-early termination according to embodiments of the present disclosure.
Figure 8:
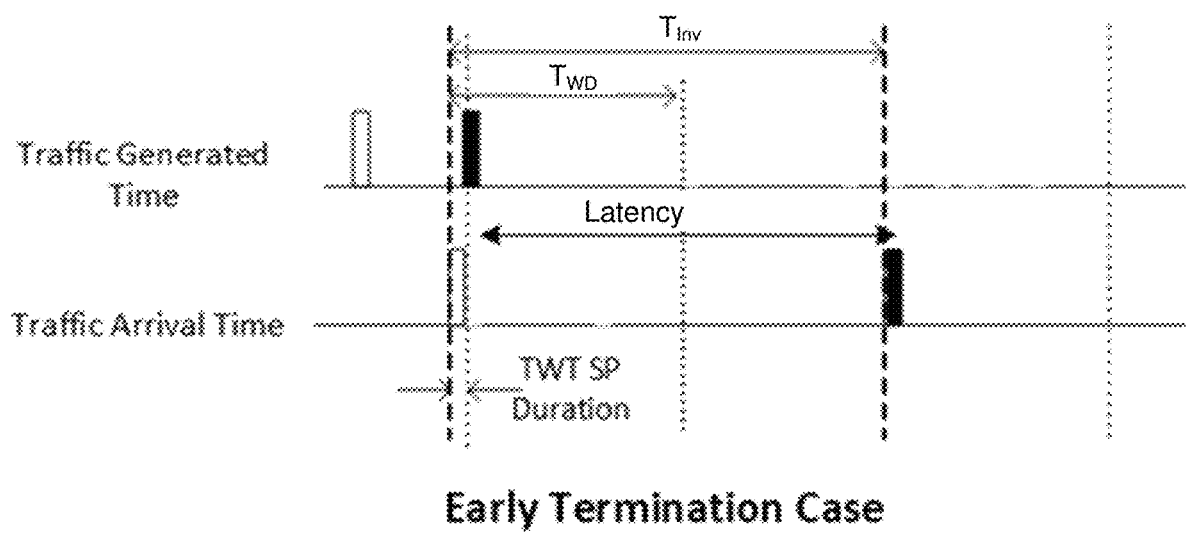

FIG. 8 illustrates a comparison of latency in early termination and non-early termination according to embodiments of the present disclosure. As shown in FIG. 8, for the non-early termination case, $T_{SP,i} = T_{wd,i}$, while in the early termination case, $0 \leq T_{SP,i} \leq T_{wd,i}$. In order to develop a solution which can apply to both early and non-early termination cases, the most strict requirement in Equation 3 can be satisfied according to the following:

$$T_{inv} \leq T_{L,Req} - T_{pkt,i} \approx T_L \quad (4)$$

Additionally, the duty cycle ($T_{SP,i}/T_{inv,i}$) needs to satisfy the following:

$$\frac{T_{SP,i}}{T_{inv,i}} \geq \frac{P_{TF,i}}{P_{THP,i}} \quad (5)$$

where $P_{TF,i}$ is the traffic in the $i^{th}$ TWT SP, and $P_{THP,i}$ is the maximum throughput that the Wi-Fi link could reach if running full duty cycle. Ideally, as long as $T_{inv,i}$ satisfies Equation 3, the same duty cycle ($T_{Sp,i}/T_{inv,i}$) would provide the same system throughput and power consumption. However, there are two factors that encourage selection of a larger $T_{inv}$ while still satisfying Equation 3. First, there is unavoidable overhead power consumption for each sleep/wakeup switching. A longer interval would lead to a smaller portion for overhead, and consequently less power consumption. Second, in practical applications, some APs and STAs would have a minimum supported $T_{wd}$ value. In this case, for a given Tin, there is a minimum effective duty cycle. From Equation 2 and Equation 5, it can be seen that the TWT parameters ($T_{inv,j}$ and $T_{wd,i}$) can be configured with the latency requirement, the traffic information, and the link quality information.

The embodiments disclosed herein can detect the latency requirement and adaptively configure the $T_{inv}$. To achieve this, applications that have similar latency requirements and data characteristics are grouped together to form a service type (such as video call, audio call, streaming, and the like). Then different algorithms are used to detect the service type using a set of selected features. For each service type, a predefined latency requirement is assigned, which is obtained from the test beforehand.

Figure 9:
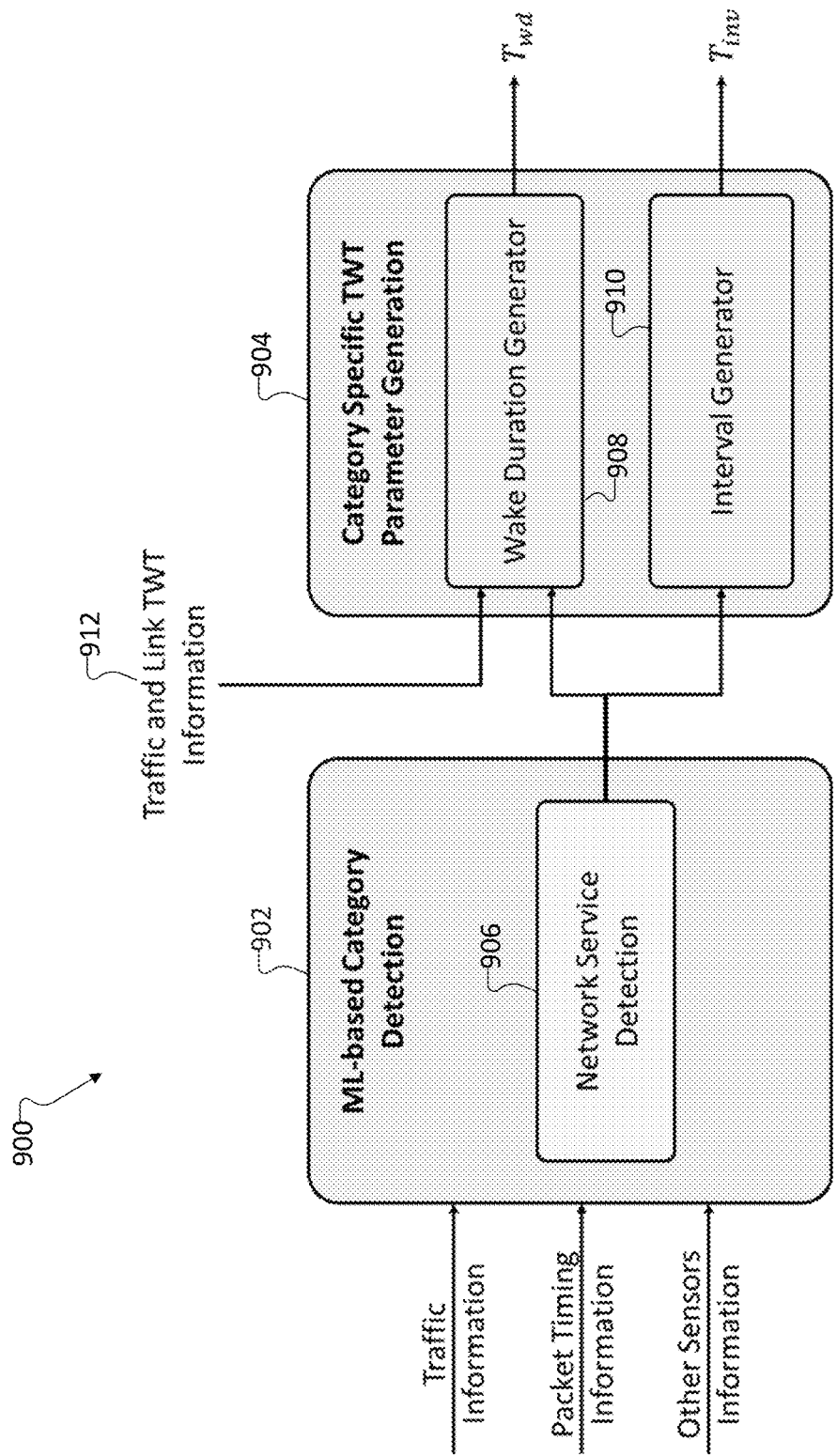
FIG. 9 illustrates details of an example system architecture for TWT parameter run-time configuration according to embodiments of the present disclosure.

FIG. 9 illustrates details of an example system architecture 900 for TWT parameter run-time configuration according to embodiments of the present disclosure. In the architecture 900, the latency requirement is based on algorithm detection instead of inputting from outside. For ease of explanation, the architecture 900 will be described as being implemented by a STA, such as one of the STAs 111-114 of FIG. 1. However, the architecture 900 can be implemented by any suitable device. The embodiment of the architecture 900 shown in FIG. 9 is for illustration only. Other embodiments of the architecture 900 could be used without departing from the scope of this disclosure.

As shown in FIG. 9, the architecture 900 includes a machine learning-based category detection system 902 and a category specific TWT parameter generation system 904. The category detection system 902 includes a network service detector 906. The category specific TWT parameter generation system 904 includes a wake duration generator 908 and an interval generator 910. Using these components, the architecture 900 can perform a process for configuring the TWT parameters. The steps of the process can be summarized as follows:

Step 1: Determine network service type. The architecture 900 uses the network service detector 906 to determine the network service type. In some embodiments, as discussed in greater detail below, the network service detector 906 includes a combination of logic-based and machine learning algorithms to recognize a set of predefined network services, including real-time service, non-real-time service, and cloud gaming service.

Step 2: Obtain latency requirement $T_{L,Req}$ based on network service type. This process is described in greater detail below.

Step 3: Set TWT wake interval (see $T_{inv}$ in FIG. 8) based on the latency requirement. In some embodiments, the interval generator 910 sets $T_{inv}=T_{L,Req}$. A basic explanation for why the interval generator 910 sets $T_{inv}=T_{L,Req}$ is given below.

If the detected network service type is cloud gaming, then the current service has very low or no tolerance for any additional latency. In this case, TWT is torn down (i.e., no TWT is used).

If the detected network service type is real-time, then the current service has low tolerance for added latency. In this case, the TWT wake interval $T_{inv}$ is set to be a small number (i.e., the latency requirement), which allows the TWT to wake up more frequently to reduce any latency it can cause.

If the detected network service type is non-real-time, then the current service has middle to high tolerance for added latency. In this case, the TWT wake interval $T_{inv}$ is set to a large number (i.e., the latency requirement), which will wake up the Wi-Fi less frequently for more power saving.

Step 4: Use the currently negotiated wake duration (see $T_{wd}$ in FIG. 8). It is noted that only the TWT wake interval $T_{inv}$ is varied based on the service that is detected by the network service detector 906. The wake duration $T_{wd}$ is held constant and acquired from existing traffic and link TWT information 912. Therefore, the wake duration generator 908 uses the current negotiated $T_{wd}$, in cases where TWT is not torn down.

Figure 10:
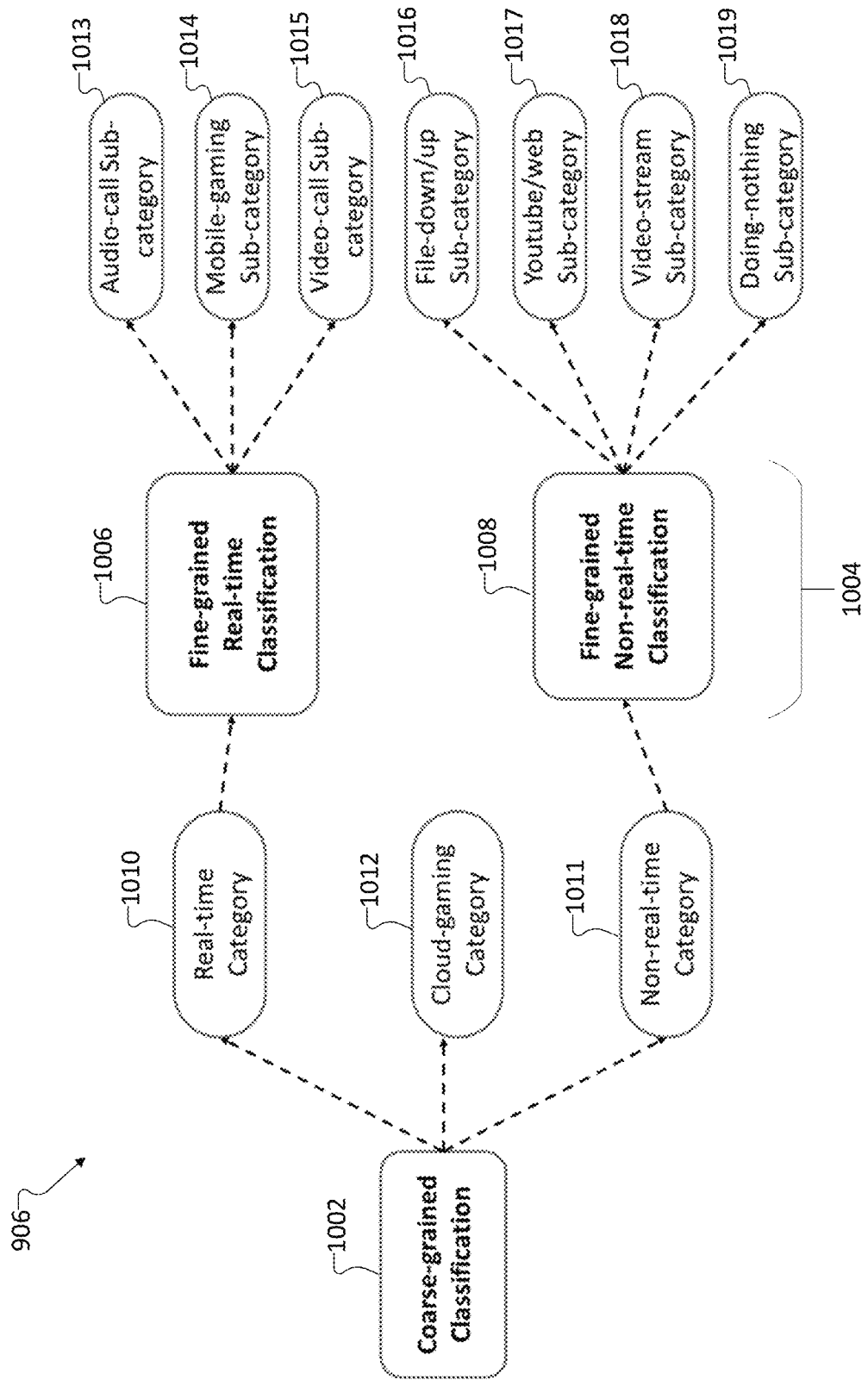
FIG. 10 illustrates additional details of a network service detector as shown in FIG. 9 according to embodiments of this disclosure.

FIG. 10 illustrates additional details of the network service detector 906 according to embodiments of this disclosure.

The network service detector 906 operates to classify different service types so that the detected service can be mapped to the latency requirement. The definition of the service type is important to the performance of the network service detector 906. On one hand, applications in the same service need to have similar latency requirement so that the classification is meaningful. On the other hand, the applications assigned to the same service type need to contain strong common signature, so that the detection accuracy could be high enough. In consideration of both the latency requirement and signature, the network service detector 906 is configured as a hierarchical classifier.

As shown in FIG. 10, the network service detector 906 includes multiple layers, including a coarse grain classification layer 1002 and a fine grain classification layer 1004. The coarse grain classification layer 1002 operates to classify the service types into three main categories, including real-time category 1010, non-real-time category 1011, and cloud gaming category 1012. At first, the coarse grain classification layer 1002 attempts to achieve a rough range of the latency requirement with strong signature. From there, the fine grain classification layer 1004 performs fine grain classifying on the results from the coarse grain classification layer 1002. The goal is to achieve a finer range of the latency requirement in the fine grain classification layer 1004 if possible. The coarse grain classification layer 1002 provides classification with very high accuracy, while the fine grain classification layer 1004 provides finer classification that could be with relatively lower accuracy (i.e., lower than that of the coarse grain classification layer 1002).

The fine grain classification layer 1004 operates to classify the sub-categories of the real-time category 1010 and the sub-categories of the non-real-time category 1011. In some embodiments, the fine grain classification layer 1004 includes two sub-classifiers: a real-time sub-classifier 1006 and a non-real-time sub-classifier 1008.

The real-time sub-classifier 1006 operates to categorize the real-time applications into sub-categories, including audio-call service 1013, mobile-gaming service 1014, and video-call service 1015. After classifying on these three classes, according to the latency requirement, the real-time sub-classifier 1006 further combines the audio-call service 1013 and the mobile-gaming service 1014 as relatively High Latency real-time applications, while the video-call service 1015 is treated as a relatively Low Latency real-time application.

The non-real-time sub-classifier 1008 operates to categorize the non-real-time applications into sub-categories, including file-DL/UL service 1016, YOUTUBE/web service 1017, video-stream service 1018, and doing-nothing 1019. Similarly, after the non-real-time classification, the non-real-time sub-classifier 1008 further combines the YOUTUBE/web service 1017, the video-stream service 1018, and the doing-nothing 1019 as relatively High Latency non-real-time type applications, while the file-DL/UL service 1016 is treated as a relatively Low Latency non-real-time type application.

Input Formulation and Service Type Defining in the Network Service Detector 906

In some embodiments, the network service detector 906 uses a set of ten network statistics features to help classify the categories and sub-categories which are computed over a duration of network flow. In some embodiments, the duration is 500 milliseconds, although other durations could be used and are within the scope of this disclosure. This time duration is defined as a burst. These network statistics features include:

Uplink maximum inter-arrival time: the maximum time difference between arrival of one packet and the next packet within a burst (1 value).

Uplink average inter-arrival time: the average time difference between arrival of one packet and the next packet within a burst (1 value).

Uplink & downlink packet counts: The uplink and downlink number of packets within a burst (2 values).

Uplink & downlink minimum packet size: The uplink and downlink minimum packet size in megabits (Mb) within a burst (2 values).

Uplink & downlink maximum packet size: The uplink and downlink maximum packet size in Mb within a burst (2 values).

Uplink & downlink average packet size: The uplink and downlink average packet size in Mb within a burst (2 values).

Figure 11:
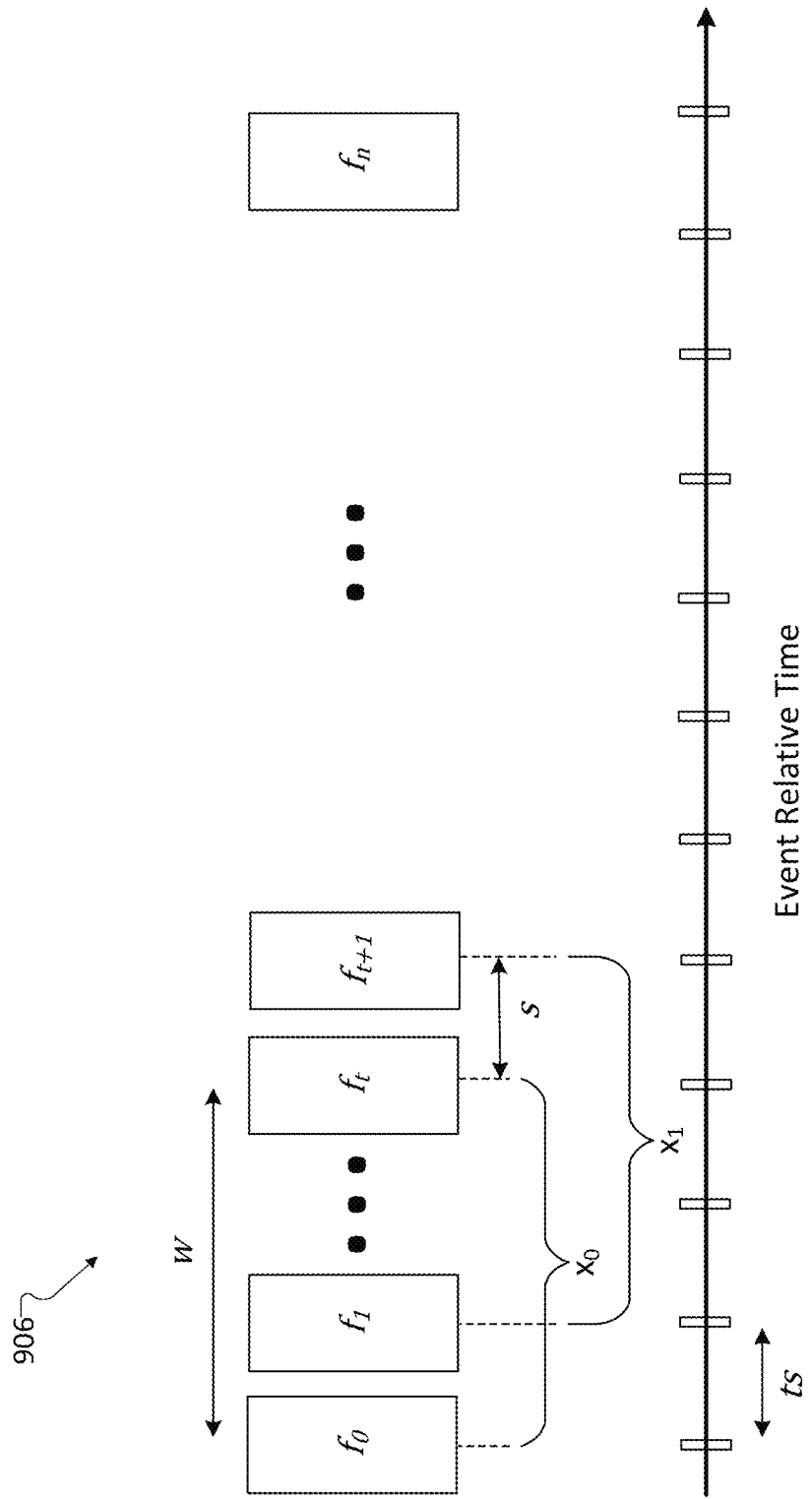
FIG. 11 illustrates an example of the input formulation for use in the network service detector of FIG. 9 according to embodiments of this disclosure.

FIG. 11 illustrates an example of the input formulation for use in the network service detector 906 according to embodiments of this disclosure. As shown in FIG. 11, a window having a size of w (in milliseconds) is used to slide along the sequence with a stride/moving step of s time steps to form the input. Each time step has a duration of ts (in milliseconds). In some examples, the moving step of s and the time step ts may equal 500 ms, although other values may be possible in other examples. Furthermore, in some examples, the moving step of s does not need to be equal to the time step ts.

At time t, the input $x_t$ includes a combination of multiple feature vectors $$\left[ f_{t-(\frac{w}{ts}-1)}, \ldots, f_t \right].$$

For example, for the coarse grain classification layer 1002, a sequence of 3 seconds (3000 milliseconds) can be used. This means that the total number of time steps for each input is $$\frac{3000 \text{ ms}}{500 \text{ ms}} = 6.$$

Therefore, the input $x_t$ at time t includes the following six feature vectors $[f_{t-5}, f_{t-4}, f_{t-3}, f_{t-2}, f_{t-1}, f_t]$.

In one embodiment, in addition to the ten network statistics features listed above, the coarse grain classification layer 1002 can also use one or more of the following features:

Difference of uplink & downlink packet counts: The difference between the packet count of uplink and downlink within a burst (1 value).

Difference of uplink & downlink minimum packet size: The difference between the minimum packet size of uplink and downlink in Mb within a burst (1 value).

Difference of uplink & downlink maximum packet size: The difference between the maximum packet size of uplink and downlink in Mb within a burst (1 value).

Difference of uplink & downlink average packet size: The difference between the average packet size of uplink and downlink in Mb within a burst (1 value).

Touch screen interaction: The user's touch screen interaction counts during a burst (1 value).

Peripheral usage: A table that store multiple flags that indicate whether the peripherals of the user equipment such as touch screen, speaker, microphone, etc. are being used (multiple values).

Uplink & downlink average throughput: The uplink and downlink average packet throughput in Mbps within a burst (2 values).

Uplink & downlink minimum throughput: The uplink and downlink minimum packet throughput in Mbps within a burst (2 values).

Uplink & downlink maximum throughput: The uplink and downlink maximum packet throughput in Mbps within a burst (2 values).

These additional features can be used to help identify the patterns in the network flow and boost the performance of the fine grain classification layer 1004 in identifying the services.

The coarse grain classification layer 1002 classifies the applications into three categories, which correspond to the following requirements: very low latency, low latency, or high latency.

For the very low latency applications, it is not reasonable to enable the TWT function due to the cost TWT induces. Therefore, it may be necessary to turn off the TWT function for this category. Among the applications that have been observed, cloud gaming applications satisfy this condition. Cloud gaming applications also have very high interaction between uplink and downlink. Therefore, the class requiring very low latency requirement is referred to herein as the cloud gaming category 1012. In defining the low latency category and high latency category, the interaction characteristic of the application between uplink and downlink connections can be leveraged. If the applications include frequent user interaction (e.g., online gaming, calling, and the like), it is assumed that the applications would require relatively low latency. Otherwise, if there is not much interaction, then the latency requirement would not be very strict (e.g., streaming, web-browsing, and the like). In general, interactive applications maintain bi-directional traffic, while non-interactive applications normally have one of the directions dominate the traffic. Therefore, this property can be used to distinguish these two categories. The category with frequent interaction is referred to herein as the real-time category 1010, while the category with less frequent interaction is referred to herein as the non-real-time category 1011.

Applications that belong to the cloud gaming category 1012 (e.g., XBOX Cloud Gaming and GOOGLE STADIA) generally have very high and consistent downlink activities. Interactions between uplink and downlink are also high. This information gives an advantage to identify cloud gaming category. The real-time category 1010 includes services such as video call applications and audio call applications (e.g., WHATSAPP, ZOOM, VIBER), and high interaction mobile games (e.g., PUBG). The non-real-time category 1011 includes services that do not require real-time interaction. Examples of these are video-streaming services (e.g., NETFLIX, DISNEY+), audio streaming services (e.g., PANDORA and SPOTIFY), web-browsing, file-downloading (DL), file-uploading (UL), etc.

The fine grain classification layer 1004 further separates the sub-categories 1013-1019 inside the real-time category 1010 and the non-real-time category 1011, as shown in FIG. 10.

Figure 12:
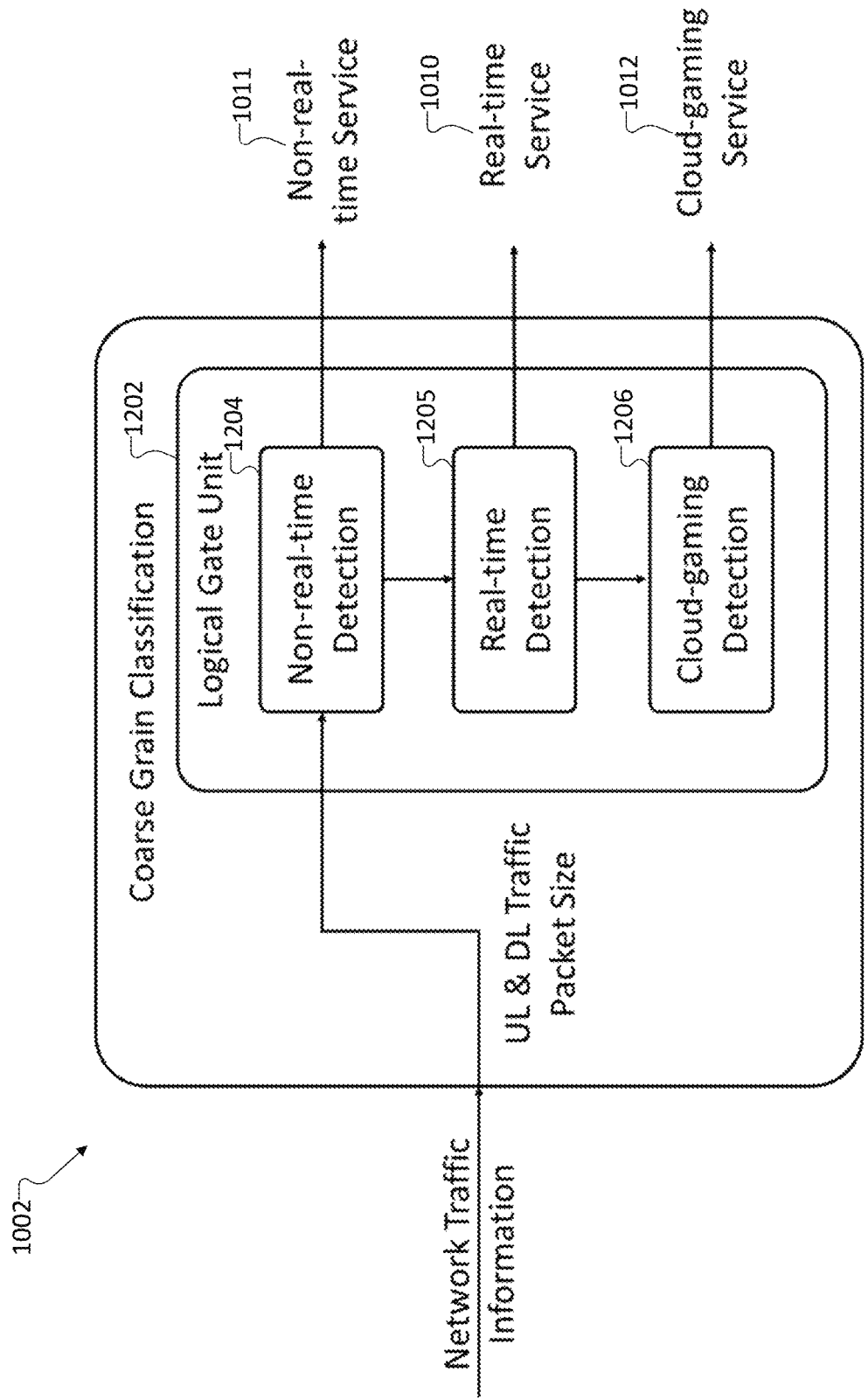
FIG. 12 illustrates an example implementation of the coarse grain classification layer of FIG. 10 according to embodiments of this disclosure.

FIG. 12 illustrates an example implementation of the coarse grain classification layer 1002 according to embodiments of this disclosure. As shown in FIG. 12, the coarse grain classification layer 1002 implements a logical rule-based approach to identify the real-time category 1010, the non-real-time category 1011, and the cloud gaming category 1012. In this embodiment, the coarse grain classification layer 1002 includes a logical gate unit 1202 that has three sequential stacks 1204-1206 connected one after another. The first stack is a non-real-time detection stack 1204, the middle stack is a real-time detection stack 1205, and the final stack is a cloud gaming detection stack 1206. The logical gate unit 1202 receives and uses network traffic information, such as the uplink and downlink packet size information. At first, the average packet size for uplink and downlink is passed to the non-real-time detection stack 1204. Further processing depends on the average pack size. If the uplink packet size is 50 bytes and the downlink packet size is 50 bytes, then it is passed to the real-time detection stack 1205. If the average uplink packet size is 100 bytes and the downlink packet size is 200 bytes, then it is passed to the cloud gaming detection stack 1206. If not, then it is classified as a real-time service 1010. If the downlink packet size is 1000 bytes or greater then it is classified as a cloud gaming service 1012. Otherwise, it is classified as a non-real-time service 1011. Of course, these packet size values are mere examples; other sizes are possible and within the scope of this disclosure.

In some embodiments, the coarse grain classification layer 1002, the fine grain classification layer 1004, or both can be implemented using different machine learning techniques. Network flow of the services will be collected for the purpose of training and testing the classifier layer(s) 1002, 1004. In one embodiment, a random forest (RF) can be used to implement the classifier layer(s) 1002, 1004. In that case, the input to the RF is a vector that has a size of 60 since there is a total of six time steps and each time step provides ten statistical features. The output is the index of the class that corresponds to the service categories. For example, for the coarse grain classification layer 1002, 0 is for real-time, 1 is for cloud-gaming, and 2 is for non-real-time.

Figure 13:
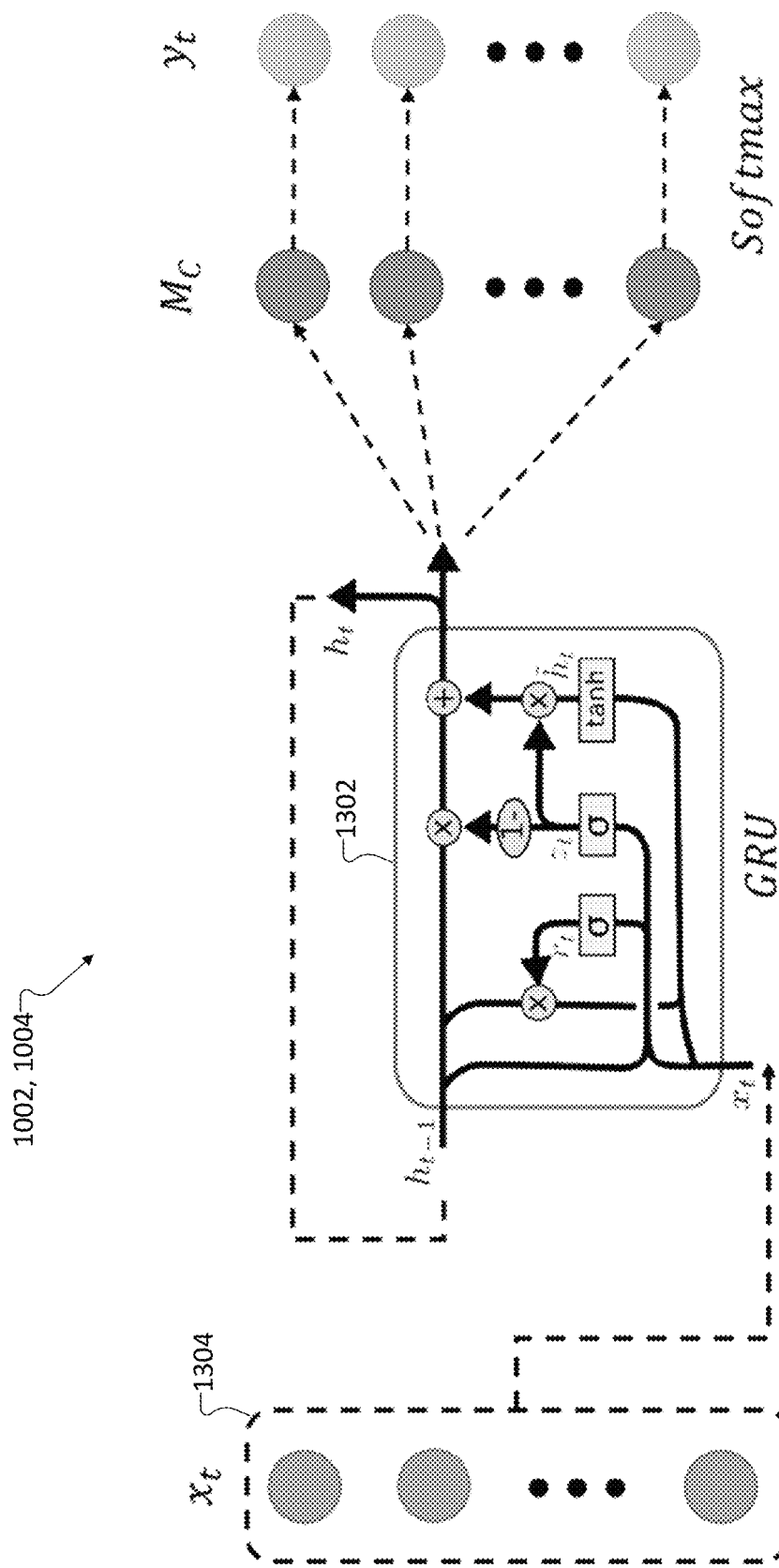
FIG. 13 illustrates an example implementation of a recurrent neural network (RNN) in the classifiers of FIG. 10 according to embodiments of this disclosure.

In some embodiments, a recurrent neural network (RNN) can be used to implement one or both classifier layers 1002, 1004. FIG. 13 illustrates an example implementation of a RNN in the classifier layer(s) 1002, 1004 according to embodiments of this disclosure. In particular, the RNN can be used to implement the real-time classifier 1006, the non-real-time classifier 1008, or both. As shown FIG. 13, the core of RNN has a gated recurrent unit (GRU) 1302. In other embodiments, the core of the RNN can be a Long Short-Term Memory (LSTM) unit or another suitable RNN core. The input to the RNN is a vector 1304 that has a shape of [t, N], for which t is the number of time-steps (e.g., t=6 for a 3 second duration) and N is the number of features (e.g., N=10).

Figure 14:
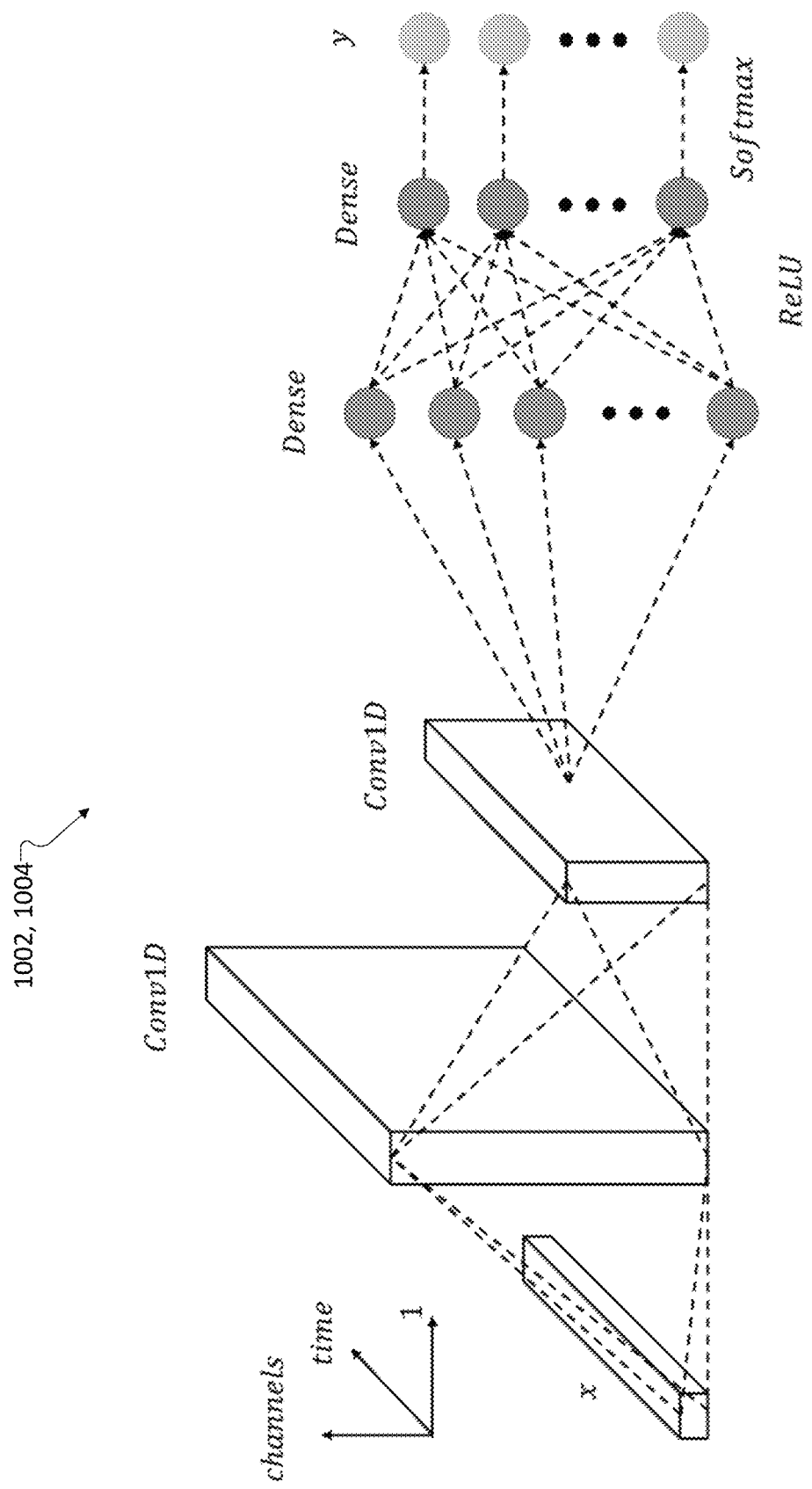
FIG. 14 illustrates an example implementation of a convolutional neural network (CNN) in the classifiers of FIG. 10 according to embodiments of this disclosure.

In other embodiments, a 1D convolutional neural network (CNN) can be used to implement one or both classifier layers 1002, 1004. FIG. 14 illustrates an example implementation of a CNN in the classifier layer(s) 1002, 1004 according to embodiments of this disclosure. In particular, the CNN can be used to implement the real-time classifier 1006, the non-real-time classifier 1008, or both. As shown FIG. 14, the CNN includes one or more convolutional layers to convolute along the time dimension. The CNN extracts features from sequences and maps the internal features of the sequence. Such a CNN is effective for deriving features and analysis of signal data over a fixed-length period.

In still other embodiments, a Gradient Boosting (XGB) method can be used to implement one or both classifier layers 1002, 1004. A XGB decision tree structure is used as the base learner, and the same ten network statistic features discussed above are used to train the XGB model. In still other embodiments, a support vector machine (SVM) can be used to implement one or both classifier layers 1002, 1004.

Subsequently, the sub-classifiers in the fine grain classification layer 1004, including the real-time sub-classifier 1006 and the non-real-time sub-classifier 1008, can be implemented using any of the machine learning techniques described previously. For some implementations of the fine grain classification layer 1004, six seconds data flow may be used, so it will be a total of twelve time steps and each time step will have ten features.

For the XGB method with the tree as the base learner, a sorting method can be used to avoid the impact of data index in training the XGB model. More specifically, the input features to the XGB are arranged with a first-in first-out (FIFO) array. For three seconds of observation data, and 0.5 seconds of observation time resolution, six time domain observations of each of the ten network statistics features can be used, which makes the FIFO array a size of 10×6=60. With each new observation every 500 ms, the first ten data points (the ten features observed three seconds ago) in the FIFO array will be discarded, and the newly observed ten data points of the ten features will be attached to the end of the FIFO array. In this way, the ten features of a specific observation time point can appear in different locations of the FIFO array, which may hinder the XGB to learn the statistics of the traffic. Thus, the FIFO array can be preprocessed before sending it to the XGB model for training. Specifically, after each time the FIFO array is updated, the features can be sorted from small to large to help the XGB model to learn the pure statistics of the data without the interference from the location of each observation point in the array.

Post-Processor

In some embodiments, the network service detector 906 can include a post processor for one or more of its component classifiers (e.g., the coarse grain classification layer 1002 and the fine grain classification layer 1004). The post processor(s) can be used to improve the quality of the outputs from the corresponding classifier. The post processor operates to take the raw predictions from its corresponding classifier and use the raw predictions to make the final prediction. Each post processor is designed to function as a voting system that has n voting slots corresponding to n time steps from the current time step to the n time step in the past.

Figure 15:
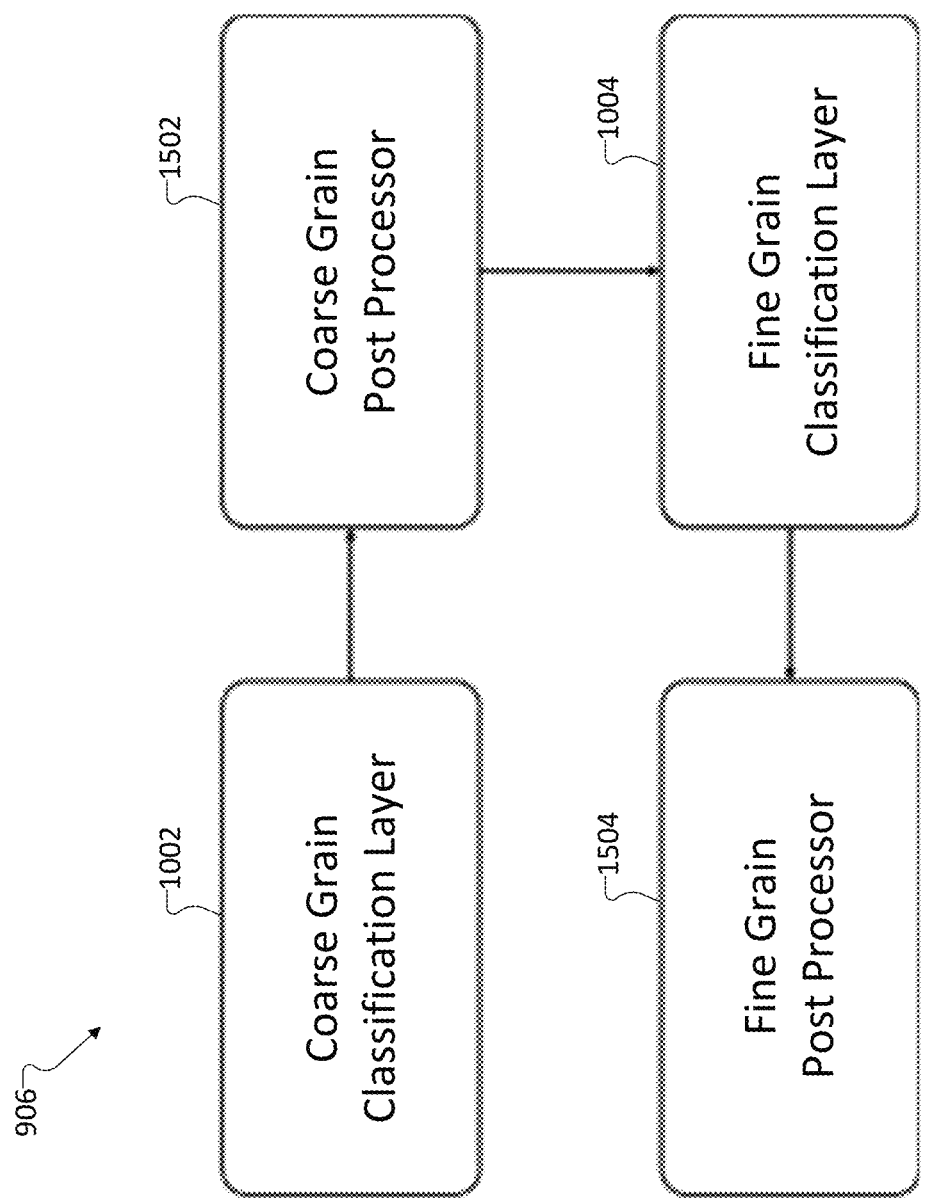
FIG. 15 illustrates an example implementation of post processors in the network service detector of FIG. 9 according to embodiments of this disclosure.

FIG. 15 illustrates an example implementation of post processors in the network service detector 906 according to embodiments of this disclosure. As shown in FIG. 15, a post processor 1502, 1504 is attached to a corresponding classifier layer 1002, 1004 in the architecture pipeline. To produce a decision, the post processors 1502, 1504 take into account the past output and the current output. Each post processor 1502, 1504 can use a FIFO buffer to store the raw prediction produce from the classifier layers 1002, 1004 from the current time step up to the m time step in the past. Different embodiments of post processors are possible, as described below.

In one embodiment, different thresholds can be used for each service category. If the occurrence of a service category in the buffer is past a threshold, the post processor will adopt this service category as the final decision. There can be multiple levels of preferences. For example, for the coarse grain classification layer 1002, if cloud-gaming occurs two times then the post processor 1502 will adopt the cloud-gaming service. If not, if non-real-time occurs five times then the post processor 1502 will adopt the non-real-time service. Otherwise, the post processor 1502 will adopt the real-time service. Of course, other threshold values are possible and within the scope of this disclosure.

Figure 16:
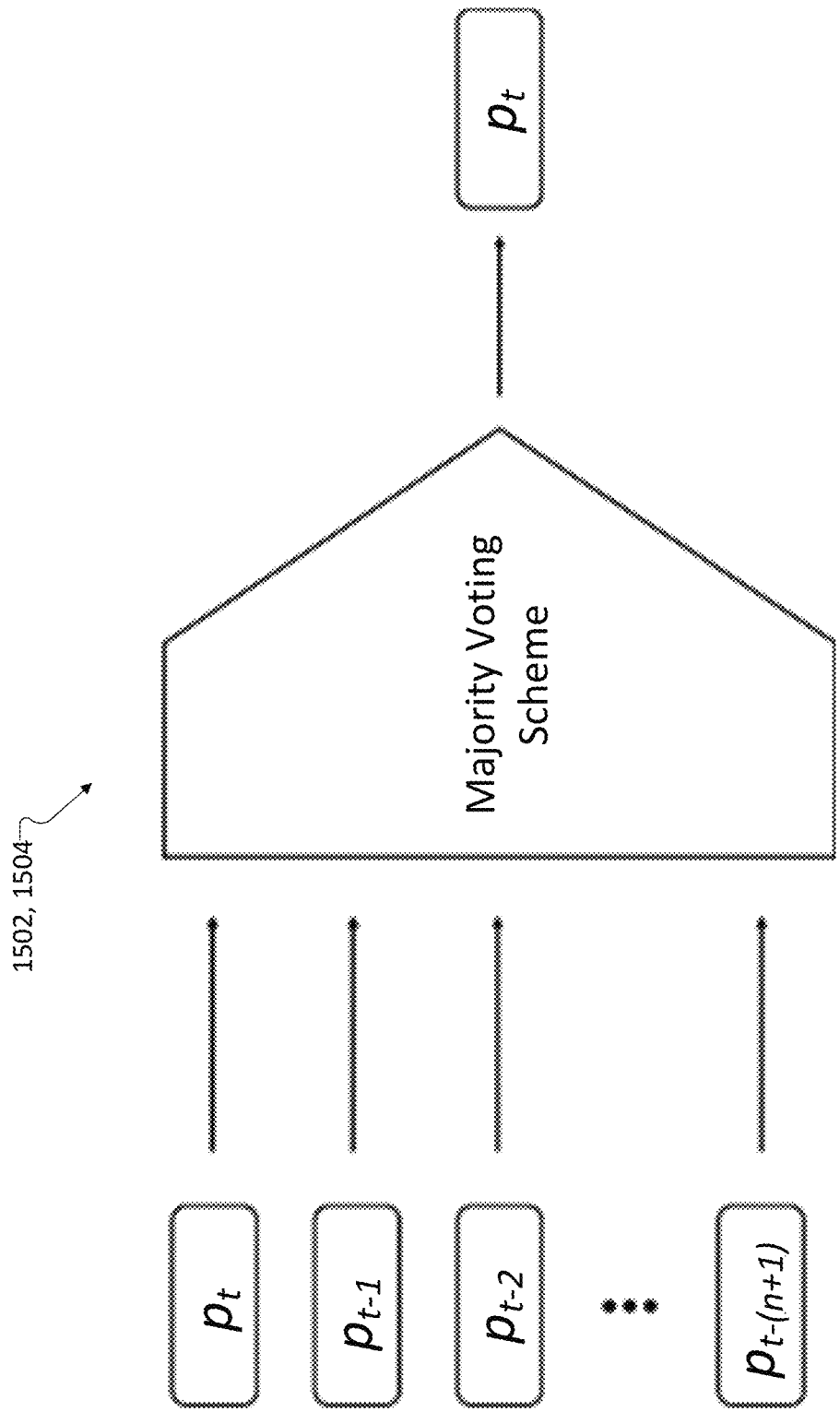
FIGS. 16 and 17 illustrate further details of examples of the post processors of FIG. 15.

FIG. 16 illustrates further details of an example of the post processor 1502, 1504 according to embodiments of this disclosure. As shown in FIG. 16, the post processor 1502, 1504 uses a majority voting scheme. The post processor

1502, 1504 can perform a majority voting decision to adopt the class label which receives the most votes to be the final decision.

Figure 17:
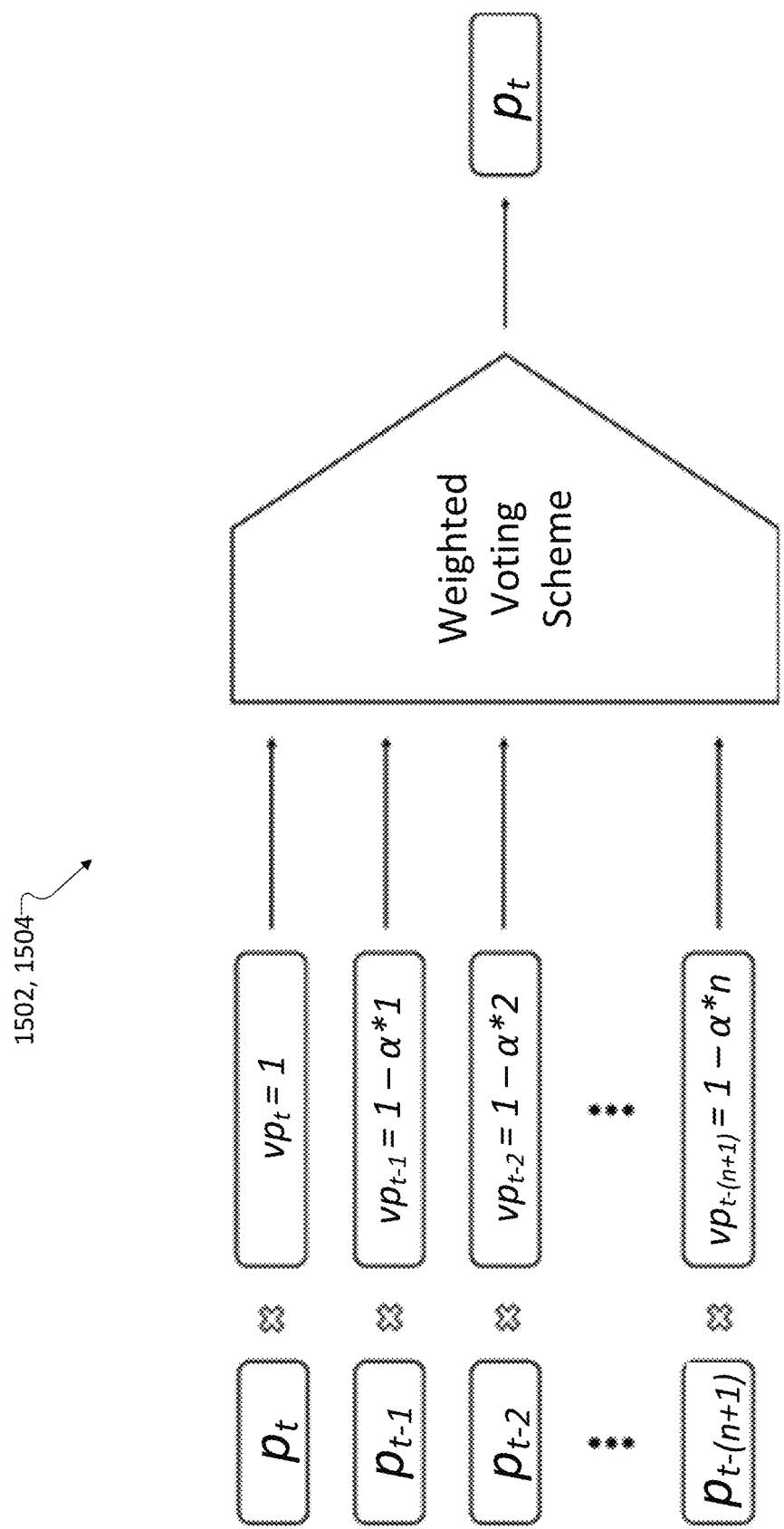

FIG. 17 illustrates further details of another example of the post processor 1502, 1504 according to embodiments of this disclosure. As shown in FIG. 17, the post processor 1502, 1504 uses a weighted voting scheme. Unlike the majority voting scheme described in FIG. 16, this voting scheme gives a voting power to each vote/raw prediction. The most recent raw prediction would be given the most voting power vp and the following raw predictions at the previous time steps will decay at a time step α. Raw predictions from the farther past shall have less voting power compared to the most recent ones.

Turning again to FIG. 9, the interval generator 910 sets $T_{inv}$ based on the latency requirement $T_{L,Req}$. In some embodiments, the latency requirement $T_{L,Req}$ can be analyzed for various applications. Then once the latency requirement $T_{L,Req}$ is obtained, the interval generator 910 sets $T_{inv}=T_{L,Req}$.

The maximum latency for a given TWT session is a function of the TWT wake interval and the minimum TWT wake duration for the previous TWT session (in order to control $T_{SP}$, early termination is turned off). Since the user experience is influenced by the maximum latency on the last hop, it is important to understand the last hop latency requirement for a given traffic stream.

Prior work largely addresses the round trip latency requirement for various applications. Since the round trip latencies are also influenced by the backbone delay values, they only provide a loose upper bound on the latency requirement on the last hop. However, a tighter bound is important for an efficient interval design. To this end, the last hop latencies can be experimentally evaluated for various applications. Based on the last hop latency requirement and similarity in the traffic stream, applications are then grouped together into various categories. The grouped categories and their associated latency requirement (e.g., which can be stored in a database or other accessible data storage) is then used by the interval generator 910 to set $T_{inv}=T_{L,Req}$.

Experimental Evaluation of Latency Requirement

For the purpose of experimental evaluation, a number of popular applications are considered (e.g., FACEBOOK, WHATSAPP, YOUTUBE, and the like). Some of the applications support features that result in more than one type of traffic. For such applications, the last hop latency requirement is evaluated for each of the traffic types that the application can generate. To achieve this, the steps given below can be followed.

Step 1: Various functions supported in popular applications are considered. For each function (e.g., audio call, video call, etc.), the latency requirement is evaluated. For a given function or application, a fixed duty cycle is established and then a number of $T_{inv}$ values are considered. Note that since the duty cycle is fixed, $T_{SP}$ varies with $T_{inv}$.

Step 2: For each pair of ($T_{inv}$, $T_{SP}$), the performance of each function or application is evaluated. As described previously, $T_L$ is approximately equal to the difference between Tin, and $T_{SP}$, when early termination is turned off. Therefore, for a given pair, the traffic gets subjected to a fixed last hop latency value as computed based on Equation (1). Therefore, as $T_{inv}$, and $T_{SP}$ are varied, the performance of the given function or application is evaluated at a number of last hop latency values.

Step 3: The maximum last hop latency value at which the application does not show any visible degradation in performance gives the maximum last hop latency the application can tolerate for the given function or application. This value serves as an upper bound for the TWT wake interval. Note that the real impact factor of the user experience is the over latency instead of last hop latency. The requirement on the last hop latency could change with the overall network condition. Considering $T_{SP}$ normally cannot be close to zero for the case requiring low latency, thus $T_{inv}$ is set to be $=T_{L,Req}$, and some margin is gained by $T_{SP}$. This could protect the latency variation from the backhaul network.

Category Grouping Based on Requirement Similarity

Applications can be grouped based on a number of criteria, aligning with the service type definition (described previously). First, applications can be grouped based on the function(s) that they support, e.g., video call functions of different applications are grouped together. If one application supports multiple functions, those functions are grouped separately. For example, WHATSAPP supports both audio calling and video calling. These two functions belong to two different groups. The list of classes is aligned with the classification by the fine grain classification layer 1004. For each of these groups, the latency requirement is the minimum of the latency requirements for the applications that fall in that group.

The various applications can be grouped into the coarse grain service types and sub-grouped into the fine grain service types according to the criteria discussed above. Overall, the coarse grain service types include cloud gaming, real-time, and non-real-time. The fine grain service types include audio call, video-call and mobile gaming for real-time, while non-real-time includes streaming, web-browsing and file DL/UL, as shown in Table 1.

TABLE 1

Application Category with Latency Requirement for Each Category

| Coarse Grain Category | Fine Grain Category | Latency Requirement | Application | Latency Requirement |
|---|---|---|---|---|
| Cloud Gaming | — | TWT OFF | — | — |
| Real Time Category | Gaming (HL) | 40 ms | Game 1 | 40 ms |
| | | | Game 2 | 40 ms |
| | | | Game 3 | 50 ms |
| | | | Game 4 | 50 ms |
| | | | Game 5 | 50 ms |
| | Audio Call (HL) | 40 ms | Audio Call App 1 | 50 ms |
| | | | Audio Call App 2 | 50 ms |
| | | | Audio Call App 3 | 50 ms |
| | | | Audio Call App 4 | 50 ms |
| | | | Audio Call App 5 | 50 ms |
| | | | Audio Call App 6 | 50 ms |

TABLE 1-continued

Application Category with Latency Requirement for Each Category

| Coarse Grain Category | Fine Grain Category | Latency Requirement | Application | Latency Requirement |
|---|---|---|---|---|
| | Video Call (LL) | 24 ms | Video Call App 1 | 40 ms |
| | | | Video Call App 2 | 50 ms |
| | | | Video Call App 3 | 50 ms |
| | | | Video Call App 4 | 25 ms |
| | | | Video Call App 5 | 25 ms |
| | | | Video Call App 6 | 25 ms |
| Non-Real-Time Category | Streaming (HL) | 48 ms | Streaming App 1 | >80 ms |
| | | | Streaming App 2 | >80 ms |
| | | | Streaming App 3 | >80 ms |
| | | | Streaming App 4 | >80 ms |
| | | | Streaming App 5 | >80 ms |
| | | | Streaming App 6 | >80 ms |
| | Web Browsing (HL) | 48 ms | Video Website | 50 ms |
| | | | News Website 1 | 64 ms |
| | | | News Website 2 | >80 ms |
| | | | News Website 3 | >80 ms |
| | | | Shopping Website 1 | >80 ms |
| | | | Shopping Website 2 | >80 ms |
| | File DL/UL (LL) | 40 ms | File Transfer App 1 | >82 ms |
| | | | File Transfer App 2 | >82 ms |
| | | | File Transfer App 3 | >82 ms |
| | | | Speed Testing | 40 ms |

Based on the test results shown in Table 1, it can been seen that in the real-time category, audio calling and mobile gaming have very similar latency requirements. Considering some mobile gaming platforms actually support voice chat in the game, there could sometimes be some error in differentiating between audio calling and mobile gaming. Therefore, the audio calling and mobile gaming applications are combined in the final service detection output as real-time HL, and assigned the same latency requirement (e.g., $T_{L,Req}$=40 ms). Video calling is handled as real-time LL, and assigned a latency requirement $T_{L,Req}$ 24 ms.

For cloud gaming, the latency requirement is very strict. Based on previous tests, it is preferred to turn off TWT for cloud gaming.

In the non-real-time category, file DL/UL includes Wi-Fi speed test applications as well. This is because these two applications have similar data patterns. Generally, this type of application does not require low latency. However, in some cases, such as GOGGLE Speed Test, if the latency is too high, the speed test result could be impacted. Due to this, the file DL/UL is handled as non-real-time LL type, and assigned a latency requirement $T_{L,Req}$=40 ms. The remaining non-real-time applications are handled as non-real-time HL type and assigned a latency requirement $T_{L,Req}$=48 ms. Note that for ideal or "no running application running" cases, a latency requirement $T_{L,Req}$=48 ms can be assigned. The summary of this grouping and the assigned $T_{L,Req}$ are illustrated in Table 1.

The application category with latency requirement for each category (e.g., Table 1, which is stored in a database, memory, or other data storage that is accessible to or included in the interval generator 910) is then used by the interval generator 910 to set $T_{inv}$. According to Equation (4), $T_{L,Req}$ will be the $T_{inv}$ that is used in TWT parameter configuration for the corresponding service type, i.e., $T_{inv}=T_{L,Req}$. Stated differently, the interval generator 910 sets $T_{inv}=T_{L,Req}$.

It is noted that only the TWT wake interval Tin, is varied based on the service that is detected by the network service detector 906. The assumption is that the wake duration $T_{wd}$ is held constant and acquired from existing link TWT information. Therefore, the wake duration generator 908 uses the current negotiated $T_{wd}$ in cases where TWT is not torn down.

Figure 18:
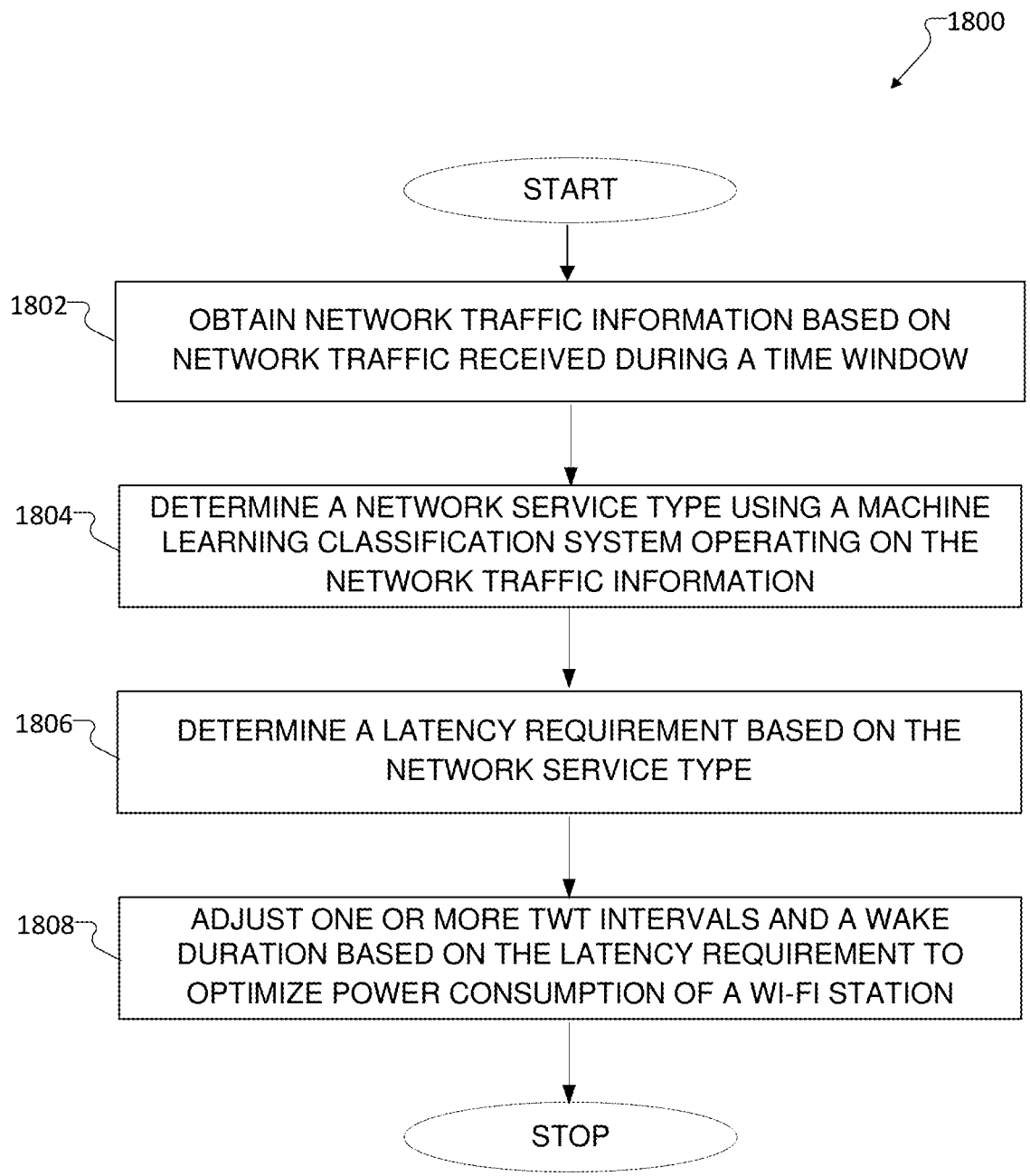
FIG. 18 illustrates a method for determining one or more TWT intervals and a wake duration according to embodiments of the present disclosure.

FIG. 18 illustrates a method 1800 for determining one or more TWT intervals and a wake duration according to embodiments of the present disclosure, as may be performed by a STA (e.g., one of the STAs 111-114 as illustrated in FIG. 1). An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

As illustrated in FIG. 18, the method 1800 begins at step 1802. At step 1802, network traffic information is obtained based on network traffic received during a time window. This could include, for example, the STA 111 obtaining network traffic information, including one or more of packet count, average packet size, packet timing information, user/peripheral interaction information, or application power consumption.

At step 1804, a network service type is determined using a machine learning classification system operating on the network traffic information. This could include, for example, the STA 111 determining a network service type using the network service detector 906 operating on the network traffic information. As discussed above, the network service detector 906 can include the coarse grain classification layer 1002 and the fine grain classification layer 1004.

At step 1806, a latency requirement is determined based on the network service type. This could include, for example, the STA 111 determining a latency requirement $T_{L,Req}$ based on the determined network service type and the latency requirement information in Table 1.

At step 1808, one or more TWT intervals and a wake duration are adjusted based on the latency requirement to optimize power consumption of a Wi-Fi station. This could include, for example, the STA 111 adjusting one or more TWT intervals $T_{inv}$ and the wake duration $T_{wd}$, in order to optimize power consumption of the STA 111.

Although FIG. 18 illustrates one example of a method 1800 for one or more TWT intervals and a wake duration, various changes may be made to FIG. 18. For example, while shown as a series of steps, various steps in FIG. 18 could overlap, occur in parallel, occur in a different order, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining network traffic information based on network traffic received during a time window;
   determining a network service type using a machine learning classification system operating on the network traffic information, the machine learning classification system comprising a coarse grain classification layer and a fine grain classification layer;
   determining a latency requirement based on the network service type; and
   adjusting one or more Target Wakeup Time (TWT) intervals and a wake duration based on the latency requirement to optimize power consumption of a Wi-Fi station,
   wherein the fine grain classification layer comprises multiple sub-classifiers, each sub-classifier comprising a recurrent neural network (RNN) or a convolutional neural network (CNN).

2. The method of claim 1, wherein the coarse grain classification layer is configured to classify the network traffic as a real-time category, a gaming category, or a non-real-time category.

3. The method of claim 2, wherein the multiple sub-classifiers comprise a real-time classifier corresponding to the real-time category and a non-real-time classifier corresponding to the non-real-time category.

4. The method of claim 1, wherein the coarse grain classification layer comprises at least one of: a RNN, a CNN, a support vector machine (SVM), a gradient boosted decision tree, or a logic-based classifier.

5. The method of claim 1, wherein the network traffic information used by the machine learning classification system includes one or more of: packet count, average packet size, packet timing information, user/peripheral interaction information, or application power consumption.

6. The method of claim 1, wherein the network service type determined using the machine learning classification system comprises at least one of: an audio call service, a video call service, a gaming service, a streaming service, a web browsing service, or a file upload/download service.

7. The method of claim 1, wherein each sub-classifier comprises a RNN.

8. The method of claim 1, wherein each sub-classifier comprises a CNN.

9. A device comprising:
   a memory configured to store instructions; and
   a processor operably connected to the memory, the processor configured when executing the instructions to:
   obtain network traffic information based on network traffic received during a time window;
   determine a network service type using a machine learning classification system operating on the network traffic information, the machine learning classification system comprising a coarse grain classification layer and a fine grain classification layer;
   determine a latency requirement based on the network service type; and
   adjust one or more Target Wakeup Time (TWT) intervals and a wake duration based on the latency requirement to optimize power consumption of a Wi-Fi station,
   wherein the fine grain classification layer comprises multiple sub-classifiers, each sub-classifier comprising a recurrent neural network (RNN) or a convolutional neural network (CNN).

10. The device of claim 9, wherein the coarse grain classification layer is configured to classify the network traffic as a real-time category, a gaming category, or a non-real-time category.

11. The device of claim 10, wherein the multiple sub-classifiers comprise a real-time classifier corresponding to the real-time category and a non-real-time classifier corresponding to the non-real-time category.

12. The device of claim 9, wherein the coarse grain classification layer comprises at least one of: a RNN, a CNN, a support vector machine (SVM), a gradient boosted decision tree, or a logic-based classifier.

13. The device of claim 9, wherein the network traffic information used by the machine learning classification system includes one or more of: packet count, average packet size, packet timing information, user/peripheral interaction information, or application power consumption.

14. The device of claim 9, wherein the network service type determined using the machine learning classification system comprises at least one of: an audio call service, a video call service, a gaming service, a streaming service, a web browsing service, or a file upload/download service.

15. A non-transitory computer readable medium comprising a plurality of instructions that, when executed by at least one processor, is configured to cause the at least one processor to:
   obtain network traffic information based on network traffic received during a time window;
   determine a network service type using a machine learning classification system operating on the network traffic information, the machine learning classification system comprising a coarse grain classification layer and a fine grain classification layer;
   determine a latency requirement based on the network service type; and
   adjust one or more Target Wakeup Time (TWT) intervals and a wake duration based on the latency requirement to optimize power consumption of a Wi-Fi station,
   wherein the fine grain classification layer comprises multiple sub-classifiers, each sub-classifier comprising a recurrent neural network (RNN) or a convolutional neural network (CNN).

16. The non-transitory computer readable medium of claim 15, wherein the coarse grain classification layer is configured to classify the network traffic as a real-time category, a gaming category, or a non-real-time category.

17. The non-transitory computer readable medium of claim 16, wherein the multiple sub-classifiers comprise a real-time classifier corresponding to the real-time category and a non-real-time classifier corresponding to the non-real-time category.

18. The non-transitory computer readable medium of claim 15, wherein the coarse grain classification layer comprises at least one of: a RNN, a CNN, a support vector machine (SVM), a gradient boosted decision tree, or a logic-based classifier.

19. The non-transitory computer readable medium of claim 15, wherein the network traffic information used by the machine learning classification system includes one or more of: packet count, average packet size, packet timing information, user/peripheral interaction information, or application power consumption.

20. The non-transitory computer readable medium of claim 15, wherein the network service type determined using the machine learning classification system comprises at least one of: an audio call service, a video call service, a gaming service, a streaming service, a web browsing service, or a file upload/download service.

* * * * *